(12) United States Patent
Bleyer et al.

(10) Patent No.: US 11,568,555 B2
(45) Date of Patent: Jan. 31, 2023

(54) DENSE DEPTH COMPUTATIONS AIDED BY SPARSE FEATURE MATCHING

(71) Applicant: Microsoft Technology Licensing, LLC, Redmond, WA (US)

(72) Inventors: Michael Bleyer, Seattle, WA (US); Raymond Kirk Price, Redmond, WA (US); Christopher Douglas Edmonds, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 339 days.

(21) Appl. No.: 16/907,960

(22) Filed: Jun. 22, 2020

(65) Prior Publication Data

US 2021/0398306 A1 Dec. 23, 2021

(51) Int. Cl.
*G06T 7/593* (2017.01)
*G06T 7/292* (2017.01)
*G06T 7/246* (2017.01)
*G02B 27/01* (2006.01)
*G06T 19/00* (2011.01)

(52) U.S. Cl.
CPC ............ *G06T 7/596* (2017.01); *G02B 27/017* (2013.01); *G06T 7/246* (2017.01); *G06T 7/292* (2017.01); *G06T 19/006* (2013.01); *G02B 2027/0178* (2013.01); *G06T 2207/10012* (2013.01); *G06T 2207/10048* (2013.01); *G06T 2207/20228* (2013.01)

(58) Field of Classification Search
None
See application file for complete search history.

(56) References Cited

U.S. PATENT DOCUMENTS

| 2014/0307066 | A1* | 10/2014 | Zhu | H04N 13/128 |
| | | | | 348/51 |
| 2017/0372457 | A1 | 12/2017 | Sylvan et al. | |
| 2019/0200001 | A1* | 6/2019 | Grunnet-Jepsen | G03B 17/54 |
| 2019/0258058 | A1 | 8/2019 | Fortin-Desch nes et al. | |

(Continued)

OTHER PUBLICATIONS

Hedenberg, et al., "A Trinocuiar Stereo System for Detection of Thin Horizontal Structures", In Advances in Electrical and Electronics Engineering—IAENG Special Edition of the World Congress on Engineering and Computer Science, Oct. 22, 2008, pp. 211-218.

(Continued)

*Primary Examiner* — Frank S Chen
(74) *Attorney, Agent, or Firm* — Workman Nydegger

(57) ABSTRACT

A system for dense depth computation aided by sparse feature matching generates a first image using a first camera, a second image using a second camera, and a third image using a third camera. The system generates a sparse disparity map using the first image and the third image by (1) identifying a set of feature points within the first image and a set of corresponding feature points within the third image, and (2) identifying feature disparity values based on the set of feature points and the set of corresponding feature points. The system also applies the first image, the second image, and the sparse disparity map as inputs for generating a dense disparity map.

20 Claims, 16 Drawing Sheets

(56) References Cited

U.S. PATENT DOCUMENTS

2020/0128225 A1 4/2020 Ge et al.
2022/0124262 A1* 4/2022 Gallucci .............. H04N 13/239

OTHER PUBLICATIONS

Kallwies, et al., "Triple-SGM: Stereo Processing using Semi-Global Matching with Cost Fusion", In Proceedings of IEEE/CVF Winter Conference on Applications of Computer Vision, Mar. 1, 2020, pp. 192-200.

Li, et al., "Dense Depth Map Reconstruction from Sparse Measurements Using a Multilayer Conditional Random Field Model", In Proceedings of the 12th Conference on Computer and Robot Vision, Jun. 3, 2015, pp. 86-93.

"International Search Report and Written Opinion Issued in PCT Application No. PCT/US2021/023723", dated Jul. 9, 2021; 30 Pages.

* cited by examiner

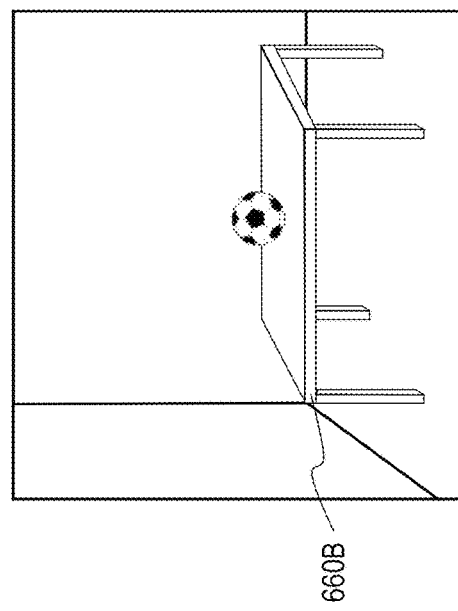
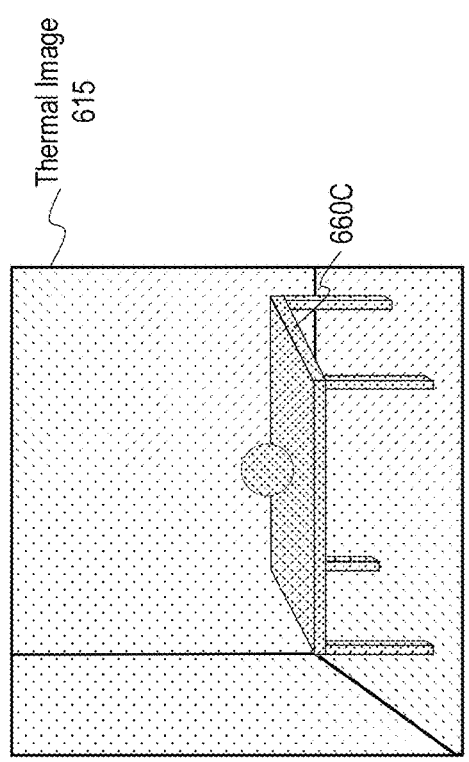
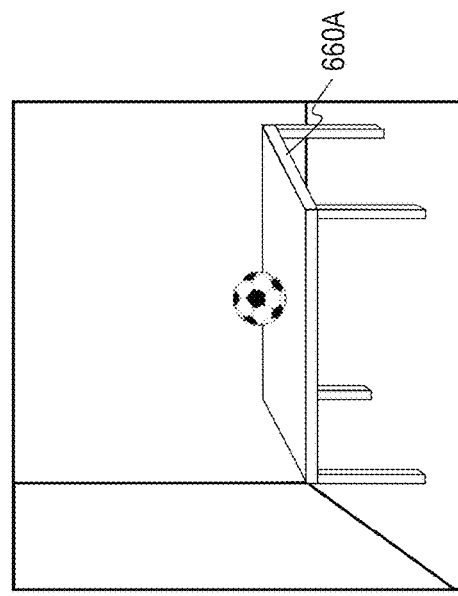
*Figure 6A*

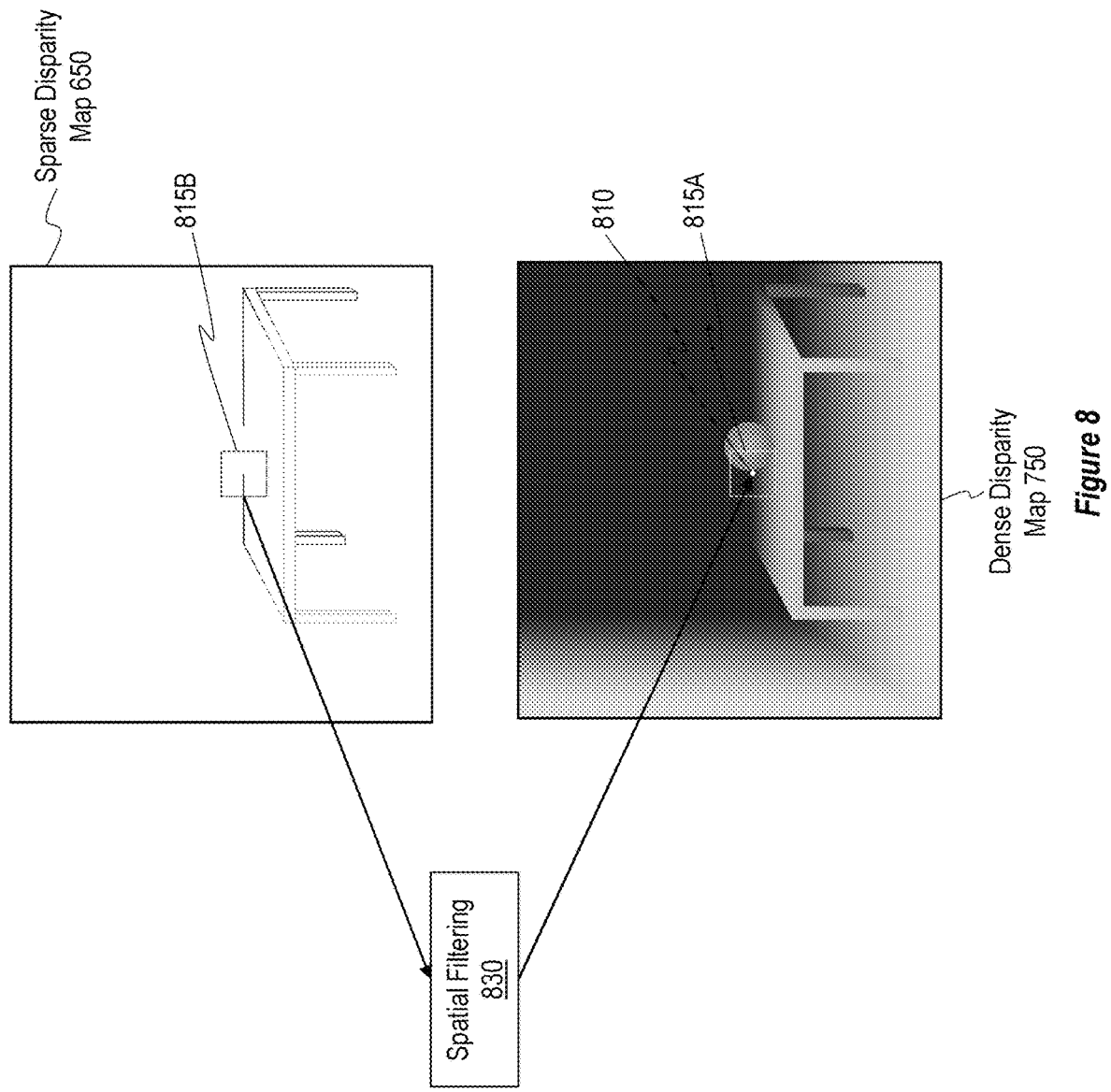

DENSE DEPTH COMPUTATIONS AIDED BY SPARSE FEATURE MATCHING

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Many mixed-reality systems include a depth reconstruction system (e.g., time of flight camera, rangefinder, stereoscopic depth cameras, etc.). A depth reconstruction system provides depth information about the real-world environment surrounding the mixed-reality system to enable the system to accurately present mixed-reality content (e.g., holograms) with respect to real-world objects. As an illustrative example, a depth reconstruction system is able to obtain depth information for a real-world table positioned within a real-world environment. The mixed-reality system is then able to render and display a virtual figurine accurately positioned on the real-world table such that the user perceives the virtual figurine as though it were part of the user's real-world environment.

Some mixed-reality systems employ stereo cameras for depth detection or for other purposes, besides depth detection. For example, a mixed-reality system may utilize images obtained by stereo cameras to provide a pass-through view of the user's environment to the user. A pass-through view can aid users in avoiding disorientation and/or safety hazards when transitioning into and/or navigating within an immersive mixed-reality environment.

Some mixed-reality systems are also configured with cameras of different modalities to enhance users' views in low visibility environments. For example, mixed-reality systems configured with long wavelength thermal imaging cameras facilitate visibility in smoke, haze, fog, and/or dust. Likewise, mixed-reality systems configured with low light imaging cameras facilitate visibility in dark environments where the ambient light level is below the level required for human vision.

A mixed-reality system can present views captured by stereo cameras to users in a variety of ways. The process of using images captured by world-facing cameras to provide three-dimensional views of a real-world environment to a user creates many challenges.

Initially, the physical positioning of the stereo cameras is physically separated from the physical positioning of the user's eyes. Thus, directly providing the images captured by the stereo cameras to the user's eyes would cause the user to perceive the real-world environment incorrectly. For example, a vertical offset between the positioning of the user's eyes and the positioning of the stereo cameras can cause the user to perceive real-world objects as vertically offset from their true position with respect to the user. In another example, a difference in the spacing between the user's eyes and the spacing between the stereo cameras can cause the user to perceive real-world objects with incorrect depth.

The difference in perception between how the cameras observe an object and how a user's eyes observe an object is often referred to as the "parallax problem" or "parallax error." FIG. 1 illustrates a conceptual representation of the parallax problem in which a stereo pair of cameras 105A and 105B is physically separated from a user's eyes 110A and 110B. Sensor region 115A conceptually depicts the image sensing regions of camera 105A (e.g., the pixel grid) and the user's eye 110A (e.g., the retina). Similarly, sensor region 115B conceptually depicts the image sensing regions of camera 105B and the user's eye 110B.

The cameras 105A and 105B and the user's eyes 110A and 110B perceive an object 130, as indicated in FIG. 1 by the lines extending from the object 130 to the cameras 105A and 105B and the user's eyes 110A and 110B, respectively. FIG. 1 illustrates that the cameras 105A and 105B perceive the object 130 at different positions on their respective sensor regions 115A, 115B. Similarly, FIG. 1 shows that the user's eyes 110A and 110B perceive the object 130 at different positions on their respective sensor regions 115A, 115B. Furthermore, the user's eyes 110A perceives the object 130 at a different position on sensor region 115A than camera 105A, and the user's eye 110B perceives the object 130 at a different position on sensor region 115B than camera 105B.

Some approaches for correcting for the parallax problem involve performing a camera reprojection from the perspective of the stereo cameras to the perspective of the user's eyes. For instance, some approaches involve performing a calibration step to determine the differences in physical positioning between the stereo cameras and the user's eyes. Then, after capturing a stereo pair of images with the stereo cameras, a step of calculating depth information (e.g., a depth map) based on the stereo pair of images is performed (e.g., by performing stereo matching). Subsequently, a system can reproject the calculated depth information to correspond to the perspective of the user's left eye and right eye.

However, calculating depth information (e.g., depth maps) based on a stereo pair of images (e.g., for addressing the parallax problem) is associated with many challenges. For example, performing stereo matching on a stereo pair of images to generate depth information (e.g., a depth map) involves identifying disparities between certain pixels of the stereo pair of images. Disparity values comprise the difference in pixel coordinates between pixels in one image and corresponding pixels in another image that represent common 3D points in the environment.

A stereo pair of images is typically rectified before performing stereo matching. After rectification, corresponding pixels in the different images of the stereo pair of images that represent common 3D points in the environment are aligned along scanlines (e.g., horizontal scanlines). For rectified images, the coordinates of the corresponding pixels in the different images only differ in one dimension (e.g., the dimension of the scanlines, such as an "x" or horizontal direction). A stereo matching algorithm may then search along the scanlines to identify pixels in the different images that correspond to one another (e.g., by performing pixel patch matching to identify pixels that represent common 3D points in the environment) and identify disparity values for the corresponding pixels.

In some instances, objects in a real-world environment are aligned with the scanlines of a rectified stereo pair of images. In one example, a rectified stereo pair of images has a horizontal scanning direction, and a real-world horizontal object (e.g., a handrail, horizontal fence member, etc.) represented in the stereo pair of images is aligned with the horizontal scanning direction. Such situations may give rise to problems when searching along the scanlines to identify corresponding pixels that represent the same 3D point in the environment. For instance, a stereo matching algorithm may identify a pixel patch in a first image centered on a pixel of a horizontal structure of the environment and may determine that several pixel patches in a second image along the same scanline and along the same horizontal structure correspond to the pixel patch of the first image (e.g., because of the similarity of the pixel patches that lie along the horizontal structure). Thus, the stereo matching algorithm may fail to accurately identify pairs of pixels in the different images that represent the same 3D point in the environment, particularly for structures in the environment that align with the scanning direction. This problem is often referred to as the "aperture problem."

The aperture problem can give rise to inaccuracies in applications that depend on depth maps. For example, a parallax-corrected image may include artifacts when representing horizontal structures in a real-world environment.

In addition to the aperture problem, other challenges exist for calculating depth information (e.g., depth maps) based on a stereo pair of images. In some instances, only one camera of a stereo pair of cameras captures certain 3D points in an environment. In one example, for an object that is close to the stereo pair of cameras, one camera may capture a portion of the object, whereas the portion of the object may be occluded from the other camera's field of view. Unless there are corresponding pixels in both images from the stereo pair, that represent the portion of the object in the image, a stereo matching algorithm may fail to generate disparity values for that portion of the object. This problem is referred to as the "occlusion problem." The occlusion problem can also give rise to inaccuracies in applications that depend on depth maps.

For at least the foregoing reasons, there is an ongoing need and desire for improved techniques and systems for calculating depth information, particularly for systems that need to perform parallax correction.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for dense depth computations aided by sparse feature matching.

Some embodiments include methods implemented by a computing system, such as a head-mounted display (HMD), in which the computing system performs various acts, including an act of generating a first image using a first camera, a second image using a second camera, and a third image using a third camera. The computing system generates a sparse disparity map using the first image and the third image by (1) identifying a set of feature points within the first image and a set of corresponding feature points within the third image, and (2) identifying feature disparity values based on the set of feature points and the set of corresponding feature points. A dense disparity map is then generated by applying the first image, the second image, and the sparse disparity map as inputs for generating the dense disparity map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6A illustrates an example of images of the environment captured by the cameras of the HMD according to FIG. 5;

FIG. 8 illustrates an example of applying spatial filtering to the dense disparity map;

DETAILED DESCRIPTION

Figure 1:
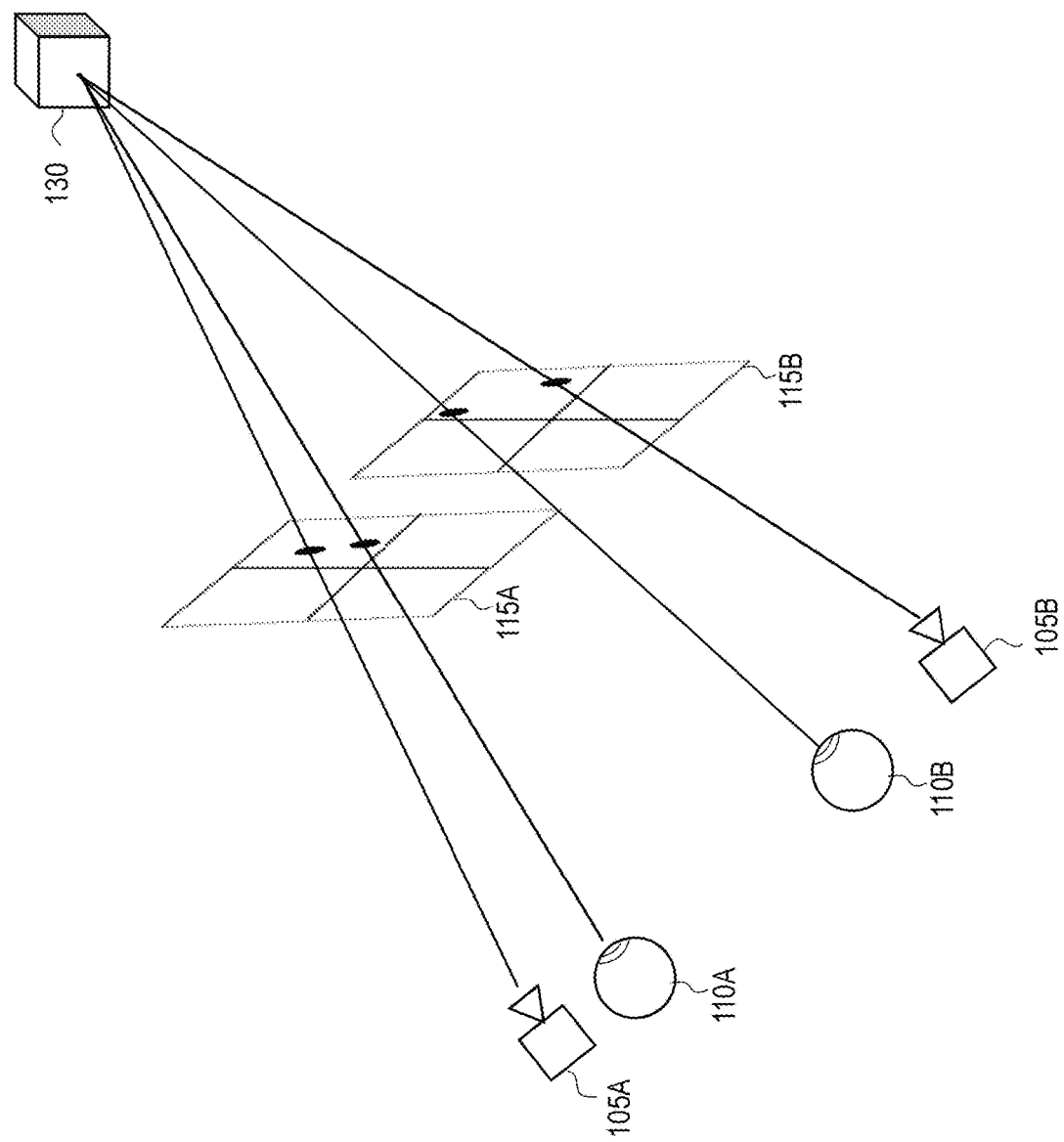
FIG. 1 illustrates an example of the parallax problem that occurs when cameras have a different perspective than a user's eyes.

Disclosed embodiments include systems and methods for performing dense depth computations aided by sparse feature matching.

In some instances, a system has three cameras. The system uses these cameras to generate a first image with the first camera, a second image with the second camera, and a third image with the third camera. The system then generates a sparse disparity map of the images by (1) identifying a set of feature points within the first image and a set of corresponding feature points within the third image, and (2) identifying feature disparity values based on the set of feature points and the set of corresponding feature points. Then, the system generates a dense disparity map by using the first image, the second image, and the sparse disparity map as inputs for the dense disparity map.

Examples of Technical Benefits, Improvements, and Practical Applications

Those skilled in the art will recognize, in view of the present disclosure, that at least some of the disclosed embodiments may address various shortcomings associated with conventional approaches for calculating depth information (e.g., depth maps). The following section outlines some example improvements and/or practical applications provided by the disclosed embodiments. It will be appreciated, however, that the following are examples only and that the embodiments described herein are in no way limited to the example improvements discussed herein.

In some implementations, providing a system that generates a dense disparity map using a first image from a first camera, a second image from a second camera, and a sparse disparity map generated based on the first image and a third image from a third camera and may at least partially compensate for the aperture problem and/or the occlusion problem described above in a manner that does not significantly add to computational cost.

For example, the relative perspectives of the first camera and the third camera (used to generate the sparse disparity map) may be different than the relative perspectives of the first camera and the second camera. As such, in some instances, real-world structures that would run in the scanning direction as between the first camera and the second camera will not run in the scanning direction as between the first camera and the third camera (e.g., alluding to the aperture problem). Furthermore, in some instances, the third camera may capture portions of real-world objects that were captured by the first camera but not by the second camera (e.g., alluding to the occlusion problem). Thus, the sparse disparity map may include disparity values that would be difficult to obtain using the first image and the second image alone (e.g., by reason of the aperture problem and/or the occlusion problem). Accordingly, using the sparse disparity map in addition to the first image and the second image to generate a dense disparity map may provide a dense disparity map with increased precision and/or reduced artifacts (e.g., as compared with a dense disparity map generated using only the first image and the second image).

Furthermore, generating a sparse disparity map based on the third image and the first image may be a relatively computationally inexpensive process (e.g., as compared with performing conventional stereo matching on the third image and the first image). Accordingly, in some instances, the above-noted benefits may be realized without significantly adding to computational cost, which may be particularly beneficial for near-real-time applications (e.g., providing parallax-corrected pass-through views of an environment).

In addition, the sparse disparity map is generated using feature points of the images. In some instances, the feature points of the images represent portions of the environment that include rich texture (e.g., edges, corners, etc.), and such portions of the environment may be recognizable across images captured by cameras of different modalities (e.g., a thermal image and a low light image). Accordingly, in some implementations, the third camera and the first camera may be cameras of different modalities.

One will appreciate, in view of the present disclosure, that the principles described herein may enhance applications that depend on accurate depth maps, such as performing parallax error correction to provide parallax-corrected images (e.g., pass-through images). Although the present disclosure focuses, in some respects, on depth map generation for performing parallax error correction, it should be noted that at least some of the principles described herein are applicable to other implementations that involve generating a depth map and/or rely on depth map generation. By way of non-limiting example, at least some of the principles disclosed herein may be employed in hand tracking (or tracking other real-world objects), stereoscopic video streaming, building surface reconstruction meshes, and/or other applications.

Having just described some of the various high-level features and benefits of the disclosed embodiments, attention will now be directed to FIGS. 2 through 9. These Figures illustrate various conceptual representations, architectures, methods, and supporting illustrations related to the disclosed embodiments. The disclosure will then turn to FIG. 10, which presents an example computer system that may include and/or be used to facilitate the disclosed principles.

Example Mixed-Reality Systems and HMDs

Figure 2:
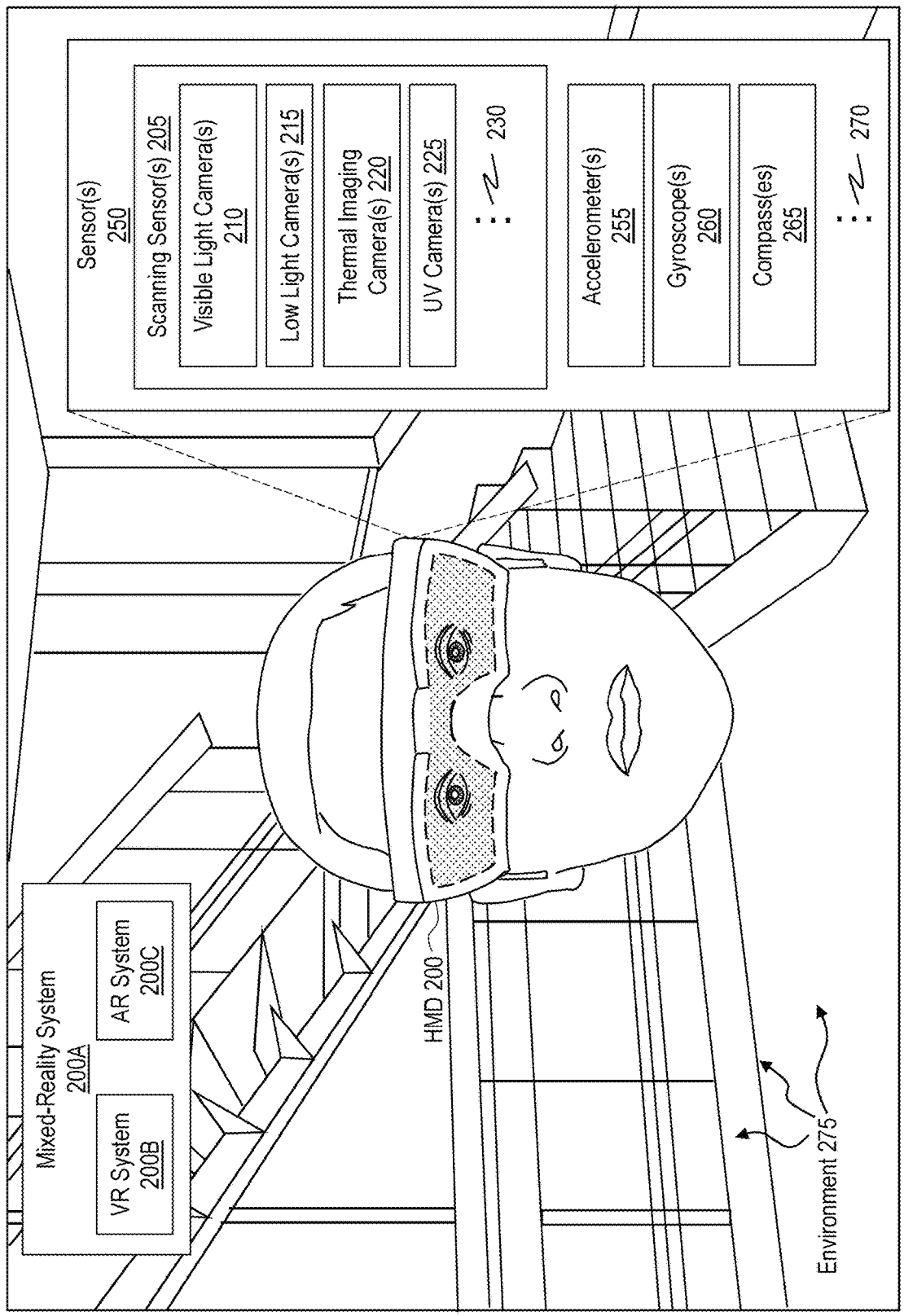
FIG. 2 illustrates an example mixed-reality system that may include or be used to implement disclosed embodiments.

Attention will now be directed to FIG. 2, which illustrates an example of a head-mounted device (HMD) 200. HMD 200 can be any type of mixed-reality system 200A (MR system), including a VR system 200B or an AR system 200C. It should be noted that while a substantial portion of this disclosure is focused, in some respects, on the use of an HMD, the embodiments are not limited to being practiced using only an HMD. That is, any type of system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

FIG. 2 illustrates HMD 200 as including sensor(s) 250, including scanning sensor(s) 205 and other sensors, such as accelerometer(s) 255, gyroscope(s) 260, compass(es) 265. The ellipsis 270 conveys that the sensor(s) 250 depicted in FIG. 2 are illustrative only and non-limiting. For instance, in some implementations, an HMD 200 includes other interoceptive and/or exteroceptive sensors not explicitly illustrated in FIG. 2, such as eye tracking systems, radio-based navigation systems, microphones, and/or other sensing apparatuses. In some implementations, an HMD 200 includes fewer sensors than those depicted in FIG. 2.

The accelerometer(s) 255, gyroscope(s) 260, and compass(es) 265 are configured to measure inertial tracking data. Specifically, the accelerometer(s) 255 is/are configured to measure acceleration, the gyroscope(s) 260 is/are configured to measure angular velocity data, and the compass(es) 265 is/are configured to measure heading data. In some instances, an HMD 200 utilizes the inertial tracking components thereof to obtain three degree of freedom (3DOF) pose data associated with the HMD (e.g., where visual tracking data, described below, is unavailable or unreliable). As used herein, 3DOF refers to position (e.g., rotation) information associated with rotational axes about three perpendicular directional axes (e.g., pitch, yaw, and roll).

The inertial tracking components/system of the HMD 200 (i.e., the accelerometer(s) 255, gyroscope(s) 260, and compass(es) 265) may operate in concert with a visual tracking system to form a head tracking system that generates pose data for the HMD 200. In some instances, a visual tracking system includes one or more cameras (e.g., head tracking cameras) that capture image data of an environment (e.g., environment 275). In some instances, the HMD 200 obtains visual tracking data based on the images captured by the visual tracking system, such as objects within the environment that may provide an anchor for determining movement of the HMD 200 relative to the environment.

For example, visual-inertial Simultaneous Location and Mapping (SLAM) in an HMD 200 fuses (e.g., with a pose filter) visual tracking data obtained by one or more cameras (e.g., head tracking cameras) with inertial tracking data obtained by the accelerometer(s) 255, gyroscope(s) 260, and compass(es) 265 to estimate six degree of freedom (6DOF) positioning (i.e., pose) of the HMD 200 in space and in real time. 6DOF refers to positioning/velocity information associated with three perpendicular directional axes and the three rotational axes (often referred to as pitch, yaw, and roll) about each of the three perpendicular directional axes (often referred to as x, y, and z).

Unless otherwise specified, any reference herein to a "pose" or a related term describing positioning and/or orientation may refer to 3DOF or 6DOF pose.

The visual tracking system of an HMD 200, in some instances, includes a stereo pair of head tracking images that is configured to obtain depth maps of the user's environment (e.g., environment 275) to provide visual mapping of the user's environment (e.g., by maintaining a surface mesh of the environment, or any other 3D representation of the environment). The HMD 200 may utilize the visual mapping data of the environment to accurately display virtual content with respect to the user's environment. Visual mapping data may also enable location sharing between users in a shared mixed-reality environment.

In some instances, the visual tracking system(s) of an HMD 200 (e.g., head tracking cameras) is/are implemented as one or more dedicated cameras. In other instances, the visual tracking system(s) is/are implemented as part of a camera system that performs other functions (e.g., as part of one or more cameras of the scanning sensor(s) 205, described hereinbelow).

The scanning sensor(s) 205 comprise any type of scanning or camera system, and the HMD 200 can employ the scanning sensor(s) 205 to scan environments, map environments, capture environmental data, and/or generate any kind of images of the environment. For example, in some instances, the HMD 200 is configured to generate a 3D representation of the real-world environment or generate a "pass-through" visualization. Scanning sensor(s) 205 may comprise any number or any type of scanning devices, without limit.

In accordance with the disclosed embodiments, the HMD 200 may be used to generate a parallax-corrected passthrough visualization of the user's environment. A "passthrough" visualization refers to a visualization that reflects what the user would see if the user were not wearing the HMD 200, regardless of whether the HMD 200 is included as a part of an AR system or a VR system. To generate this passthrough visualization, the HMD 200 may use its scanning sensor(s) 205 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique. In some instances, as the camera modules are not telecentric with the user's eyes, the perspective difference between the user's eyes and the camera modules may be corrected to provide parallax-corrected pass-through visualizations.

To convert a raw image into a passthrough image, the scanning sensor(s) 205 typically rely on its cameras (e.g., visible light camera(s) 210, low light camera(s) 215, thermal imaging camera(s) 220, UV camera(s), or any other type of camera) to obtain one or more raw images of the environment (e.g., environment 275). In some instances, in addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images, and passthrough images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps (and possibly the raw images), a 3D representation of the environment can be generated. Unless otherwise specified, the terms "depth map" and "disparity map" are used interchangeably herein.

Relatedly, from the passthrough visualizations, a user will be able to perceive what is currently in his/her environment without having to remove or reposition the HMD 200. Furthermore, as will be described in more detail later, the disclosed passthrough visualizations may also enhance the user's ability to view objects within his/her environment (e.g., by displaying additional environmental conditions that may not have been detectable by a human eye).

It should be noted that while a portion of this disclosure focuses on generating "a" passthrough image, the implementations described herein may generate a separate passthrough image for each one of the user's eyes. That is, two passthrough images are typically generated concurrently with one another. Therefore, while frequent reference is made to generating what seems to be a single passthrough image, the implementations described herein are actually able to simultaneously generate multiple passthrough images.

In some embodiments, scanning sensor(s) 205 include cameras of various modalities, such as visible light camera(s) 210, low light camera(s) 215, thermal imaging camera(s) 220, Near Infrared (NIR) Cameras (in the 800 nm to 2 um range), and/or potentially (though not necessarily) ultraviolet (UV) cameras 225. The ellipsis 230 demonstrates how any other type of camera or camera system (e.g., depth cameras, time of flight cameras, etc.) may be included among the scanning sensor(s) 205. As an example, a camera structured to detect mid-infrared wavelengths may be included within the scanning sensor(s) 205.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 210 include red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras may be implemented as stereoscopic cameras, meaning that the fields of view of the two or more RGB cameras at least partially overlap with one another. With this overlapping region, images generated by the visible light camera(s) 210 can be used to identify disparities between certain pixels that commonly represent an object captured by both images. Disparities are typically measured after applying rectification to the stereo pair of images such that corresponding pixels in the images that commonly represent an object in the environment are aligned along scanlines. After rectification, corresponding pixels in the different images that commonly represent an object in the environment only differ in one dimension (e.g., the direction of the scanlines, such as the horizontal direction). The one-dimensional difference between the coordinates of corresponding pixels in their respective images of the stereo pair of images represents the disparity value for the object represented by the corresponding pixels.

Based on these pixel disparities, the embodiments are able to determine depths for objects located within the overlapping region (i.e. "stereoscopic depth matching," "stereo depth matching," or simply "stereo matching"). The depths for the objects/3D points of the environment located within the overlapping region may be represented as pixels of a depth map. As such, the visible light camera(s) 210 can be used to not only generate passthrough visualizations, but they can also be used to determine object depth. In some embodiments, the visible light camera(s) 210 can capture both visible light and IR light.

Those skilled in the art will recognize, in view of the present disclosure, that stereo matching may be performed on a stereo pair of images obtained by any type and/or combination of cameras. For example, an HMD 200 or other system may comprise any combination of visible light camera(s) 210, low light camera(s) 215, thermal imaging camera(s) 220, UV camera(s) 225, Near Infrared Red, and/or other cameras to capture a stereo pair of images upon which to perform stereo matching (e.g., for the overlapping region of the stereo pair of images).

In some instances, the low light camera(s) 215 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. In some instances, the low light camera(s) 215 are structured to detect or be sensitive to IR light in at least the near-IR range.

In some embodiments, the visible light camera(s) 210 and the low light camera(s) 215 operate in approximately the same overlapping wavelength range. In some cases, this overlapping wavelength range is between about 400 nanometers and about 1,000 nanometers. Additionally, in some embodiments these two types of cameras are both silicon detectors.

In some instances, one distinguishing feature between these two types of cameras is related to the illuminance conditions or illuminance range(s) in which they actively operate. In some cases, the visible light camera(s) 210 are low power cameras and operate in environments where the illuminance is between about 10 lux and about 100,000 lux (e.g., for an example commercial visible light camera), or rather, the illuminance range begins at about 10 lux and increases beyond 10 lux. In contrast, the low light camera(s) 215 consume more power and operate in environments where the illuminance range is between overcast starlight and dusk lighting levels. In some instances, the device operates in environments between about 1 milli-lux and about 10 lux (e.g., for a typical commercial low light camera).

The thermal imaging camera(s) 220, in some instances, are structured to detect electromagnetic radiation or IR light in the far-IR (i.e. thermal-IR) range, though some implementations also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns. Because the thermal imaging camera(s) 220 detect far-IR radiation, the thermal imaging camera(s) 220 can operate, in some instances, in any illuminance condition.

In some cases (though not necessarily all), the thermal imaging camera(s) 220 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 225 are structured to capture light in the UV range. The UV range includes electromagnetic radiation having wavelengths between about 10 nm and about 400 nm. The disclosed UV camera(s) 225 should be interpreted broadly and may be operated in a manner that includes both reflected UV photography and UV induced fluorescence photography.

In some instances, visible light cameras are cameras that are used for computer vision to perform head tracking (e.g., as described hereinabove). These cameras can detect visible light, or even a combination of visible and IR light (e.g., a range of IR light). In some cases, these cameras are global shutter devices with pixels being about 3 µm in size.

Low light cameras, in some instances, are cameras that are sensitive to visible light and near-IR. These cameras are larger and may have pixels that are about 5 µm in size or larger. These cameras are also sensitive to wavelengths that silicon sensors are sensitive to, which wavelengths are between about 350 nm to 1100 nm.

In some implementations, thermal/long wavelength IR devices (i.e. thermal imaging cameras) have pixel sizes that are about 10 µm or larger and detect heat radiated from the environment. These cameras may be sensitive to wavelengths in the 8 µm to 14 µm range. Some embodiments also include mid-IR cameras configured to detect at least mid-IR light. These cameras often comprise non-silicon materials (e.g., InP or InGaAs) that detect light in the 800 nm to 2 µm wavelength range.

Generally, the low light camera(s) 215, the thermal imaging camera(s) 220, and the UV camera(s) 225 (if present) consume relatively more power than the visible light camera(s) 210. Therefore, when not in use, the low light camera(s) 215, the thermal imaging camera(s) 220, and/or the UV camera(s) 225 are typically in the powered-down state in which those cameras are either turned off (and thus consuming no power) or in a reduced operability mode (and thus consuming substantially less power than if those cameras were fully operational). In contrast, the visible light camera(s) 210 are typically in the powered-up state in which those cameras are by default fully operational.

It should be noted that any number of cameras may be provided on the HMD 200 for each of the different camera types. That is, the visible light camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215, the thermal imaging camera(s) 220, and the UV camera(s) 225 may each respectively include 1, 2, 3, 4, 5, 6, 7, 8, 9, 10, or more than 10 corresponding cameras.

Figure 3:
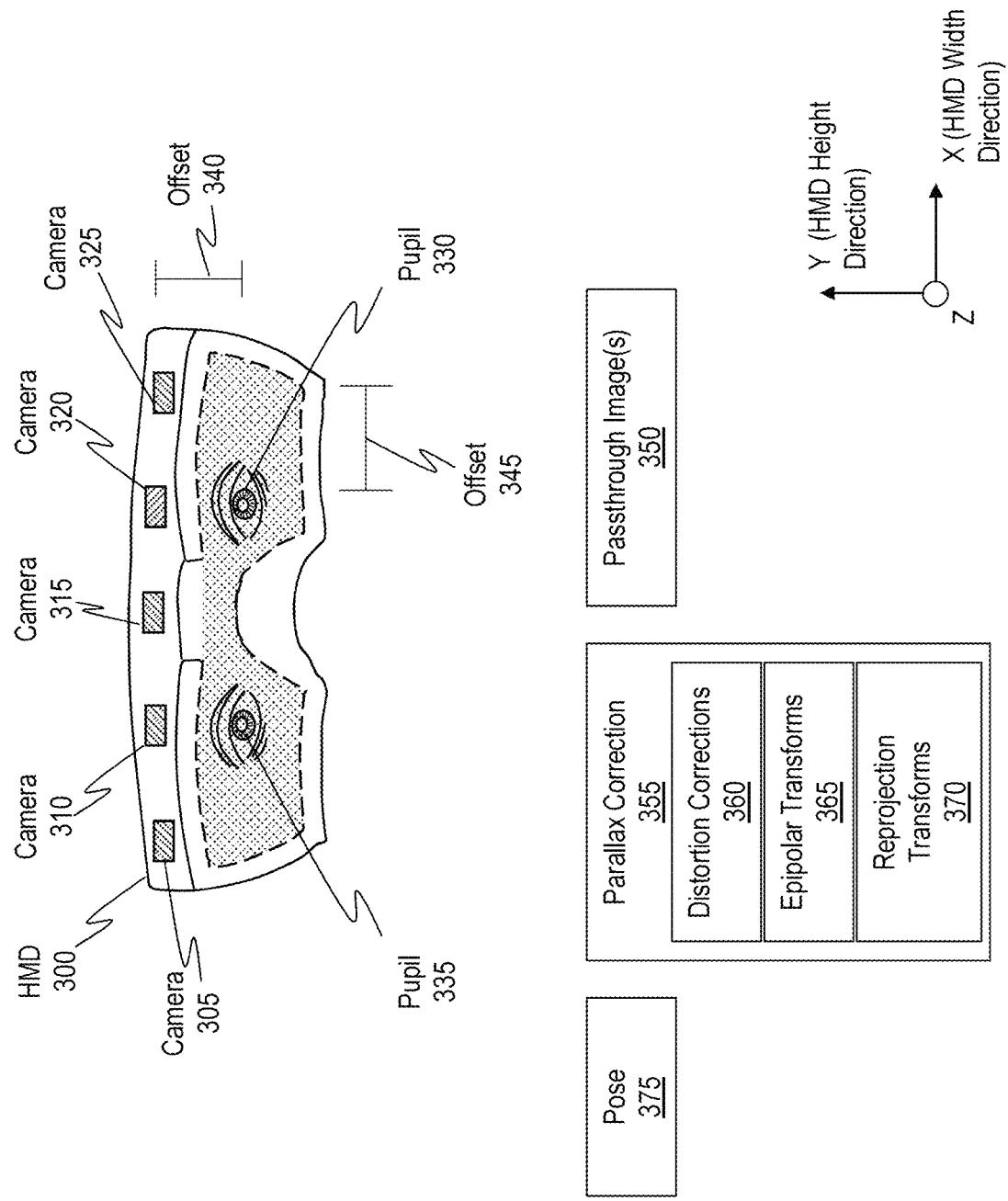
FIG. 3 illustrates example structural configurations of components of an example mixed-reality system, as well as an example of a parallax correction operation.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the visible light camera(s) 210, the low light camera(s) 215, the thermal imaging camera(s) 220, and the UV camera(s) 225 from FIG. 2. While only 5 cameras are illustrated in FIG. 3, HMD 300 may include more or fewer than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340 (representing the vertical offset between a user's eye and camera 325). Similarly, there may be a horizontal offset in the HMD width direction (i.e. the "X" axis), as shown by offset 345 (representing the horizontal offset between a user's eye and camera 325). Each camera may be associated with a different offset.

As described earlier, HMD 300 is configured to provide passthrough image(s) 350 for the user of HMD 300 to view. In doing so, HMD 300 is able to provide a visualization of the real world without requiring the user to remove or reposition HMD 300. In some instances, these passthrough image(s) 350 effectively represent the same view the user would see if the user were not wearing HMD 300. In some instances, the HMD 300 employs at least some of cameras 305-325 to provide these passthrough image(s) 350. In some instances, the passthrough images may have various levels of processing performed on the sensors, including denoising, tone mapping, and/or other processing steps to produce high quality imagery. Additionally, camera reprojection steps (e.g., parallax correction) may or may not be performed, as well, to correct for the offset between the user's perspective and the camera position.

FIG. 3 illustrates an implementation in which none of the cameras 305-325 are directly aligned with the pupils 330 and 335. The offsets 340 and 345 introduce differences in perspective as between the cameras 305-325 and the pupils 330 and 335. These perspective differences are referred to as "parallax."

Because of the parallax occurring as a result of the offsets 340 and 345, raw images produced by the cameras 305-325, in some instances, are not available for immediate use as passthrough image(s) 350. Instead, it may be beneficial to perform a parallax correction 355 (aka an image synthesis or reprojection) on the raw images to transform (or reproject) the perspectives embodied within those raw images to correspond to perspectives of the user's pupils 330 and 335. The parallax correction 355 includes any number of distortion corrections 360 (e.g., to correct for concave or convex wide or narrow angled camera lenses), epipolar transforms 365 (e.g., to parallelize the optical axes of the cameras), and/or reprojection transforms 370 (e.g., to reposition the optical axes so as to be essentially in front of or in-line with the user's pupils).

The parallax correction 355 includes performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are based on a current pose 375 of the HMD 300 relative to its surrounding environment (e.g., as determined via visual-inertial SLAM). Based on the pose 375 and the depth maps that are generated, the HMD 300 and/or other system is/are able to correct parallax error by reprojecting a perspective embodied by the raw images to coincide with a perspective of the user's pupils 330 and 335.

By performing these different transforms, the HMD 300 is able to perform three-dimensional (3D) geometric transforms on the raw camera images to transform the perspectives of the raw images in a manner so as to correlate with the perspectives of the user's pupils 330 and 335. Additionally, the 3D geometric transforms rely on depth computations in which the objects in the HMD 300's environment are mapped out to determine their depths as well as the pose 375. Based on these depth computations and pose 375, the HMD 300 is able to three-dimensionally reproject or three-dimensionally warp the raw images in such a way so as to preserve the appearance of object depth in the passthrough image(s) 350, where the preserved object depth substantially matches, corresponds, or visualizes the actual depth of objects in the real world. Accordingly, the degree or amount of the parallax correction 355 is at least partially dependent on the degree or amount of the offsets 340 and 345.

By performing the parallax correction 355, the HMD 300 effectively creates "virtual" cameras having positions that are in front of the user's pupils 330 and 335. By way of additional clarification, consider the position of camera 305, which is currently above and to the left of pupil 335. By performing the parallax correction 355, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were coaxially aligned with pupil 335 and, in some instances, at the exact position of pupil 335.

Dense Depth Computations Aided by Sparse Feature Matching

Figure 4A:
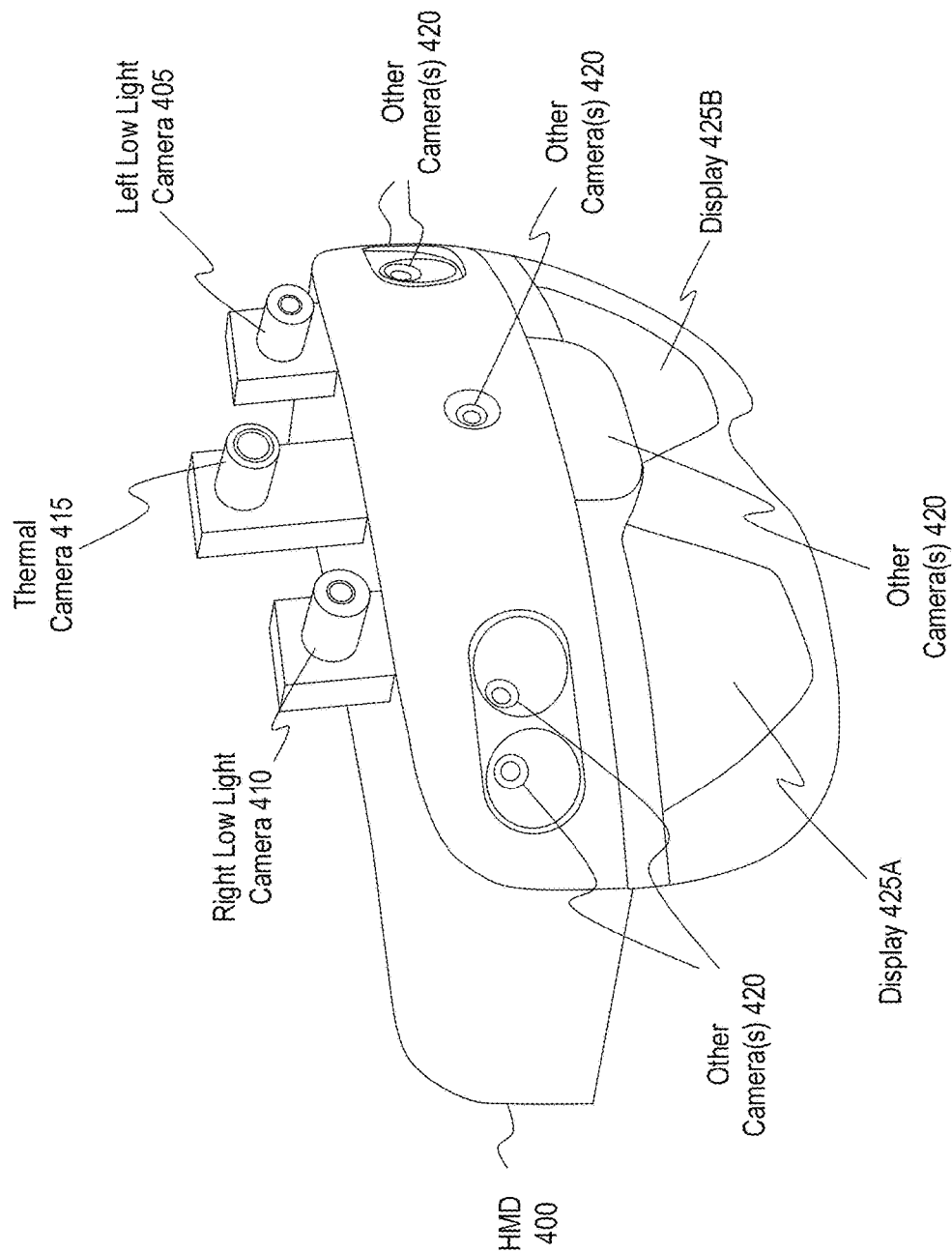
FIGS. 4A-4C illustrate an example head-mounted display (HMD) that includes various cameras that may facilitate the disclosed embodiments.
Figure 4B:
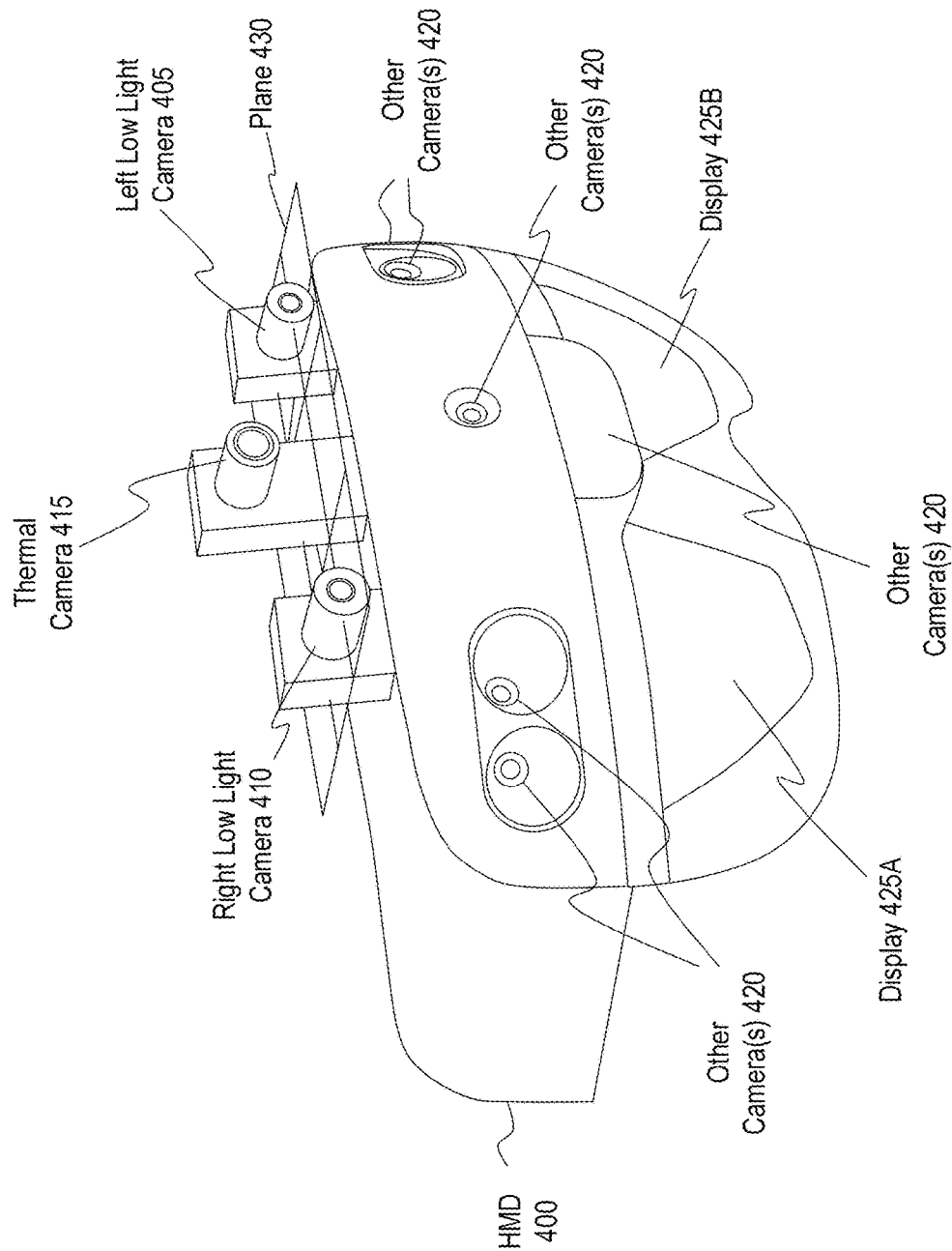
Figure 4C:
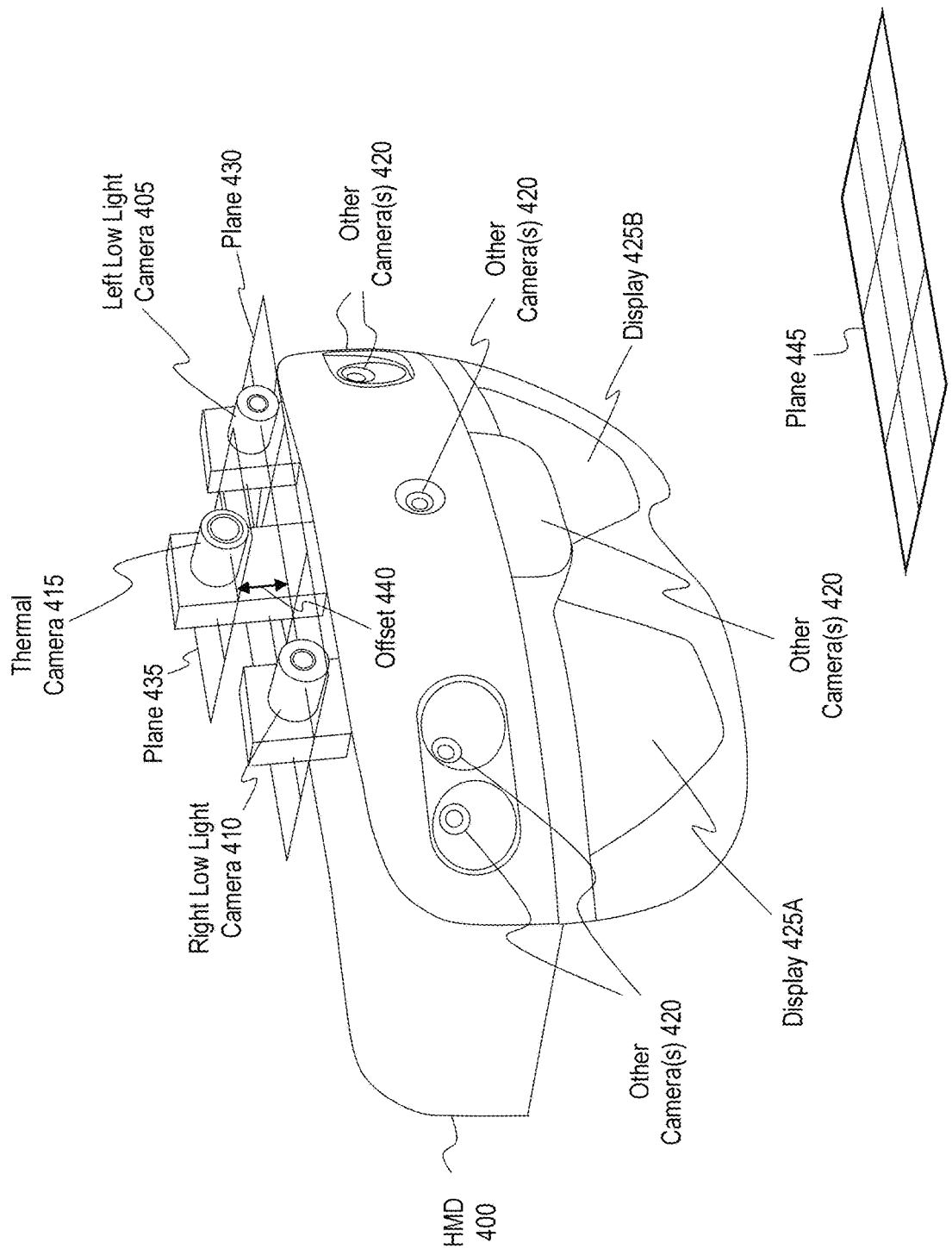

Attention is now directed to FIGS. 4A-4C, illustrate an example head-mounted display (HMD) 400 that includes various cameras that may facilitate the disclosed embodiments. The HMD 400 may correspond in at least some respects to any HMD described herein (e.g., HMD 200, HMD 300). The HMD 400 of FIG. 4A includes a left low light camera 405, a right low light camera 410, and a thermal camera 415. In some instances, as shown in FIG. 4A, the HMD 400 also includes other cameras 420 which may serve various functions, such as head tracking, hand/object tracking, video capture, etc. The HMD 400 also includes displays 425A and 425B for displaying virtual content (e.g., holograms, parallax-corrected images, etc.) to a user wearing the HMD 400.

As will be described in more detail hereinafter, the HMD 400 may capture images with the left low light camera 405, the right low light camera 410, and the thermal camera 415 to generate sparse disparity maps and/or dense disparity maps (see FIGS. 6A-7B). In this regard, cameras of different modalities may be used to capture the different images. For example, in some instances, the HMD captures a left low light image with the left low light camera 405, a right low light image with the right low light camera 410, and a thermal image with the thermal camera 415. Furthermore, in some instances, the HMD 400 generates a sparse disparity map using the left (or right) low light image and the thermal image. Still furthermore, in some instances, the HMD 400 generates a dense disparity map using the left and right low light images and the sparse disparity map.

As used herein, a dense disparity map may refer to a disparity map generated using an algorithm that attempts to obtain a disparity value for each pixel of the disparity map. For example, a dense disparity map may store depth information for all pixels of the disparity map, or at least a high percentage of the pixels of the disparity map (e.g., more than 50% of the pixels, 60% or more of the pixels, 70% or more of the pixels, or even more preferably, 80% or more of the pixels). In contrast, as used herein, a sparse disparity map may refer to a disparity map generated using an algorithm that does not attempt to obtain a disparity value for each pixel of the disparity map. For example, a sparse disparity map may store depth information for a small percentage of the pixels of the disparity map (e.g., less than 50% of the pixel, less than 40% of the pixels, less than 30% of the pixels, less than 20% of the pixels, less than 15% of the pixels, or even more preferably, 5% or less of the pixels).

Although the present disclosure focuses, in some respects, on an HMD 400 that includes pair of low light cameras (e.g., left low light camera 405 and right low light camera 410) and a thermal camera for obtaining images used to generate sparse and/or dense depth maps, it should be noted that other camera configurations/modalities are within the scope of this disclosure.

In some implementations, the HMD 400 may include any combination of visible light camera(s) 210, low light camera(s) 215, thermal imaging camera(s) 220, UV camera(s) 225, Near Infrared Red, and/or other cameras for generating sparse and/or dense depth maps, such as a set of three cameras of the same modality, a set of three cameras with two cameras sharing a same modality and one camera having a different modality, or a set of three cameras of three different modalities. Furthermore, in some implementations, the HMD 400 includes more than three cameras for generating sparse and/or dense depth maps according to the present disclosure.

FIG. 4B illustrates that the left low light camera 405 and the right low light camera 410 of the HMD 400 are mounted on the HMD 400 along plane 430 that is associated with and relative to the HMD 400. In this regard, the term "mounted on" indicates that the optical center of the cameras (405 and 410) and/or their camera lenses are parallel to or pass through plane 430. For instance, FIG. 4B depicts plane 430 as a horizontal plane relative to the HMD 400 that passes through a center portion of the cameras 405 and 410. In some embodiments, the left low light camera 405 and the right low light camera 410 are a stereo pair of low light cameras that are configured to capture stereo pairs of low light images for performing stereo matching to identify pixel disparities in the horizontal direction (e.g., relative to the HMD 400).

FIG. 4C illustrates that the thermal camera 415 is mounted on the HMD 400 offset from the plane 430. For instance, FIG. 4C illustrates the thermal camera 415 positioned on plane 435. In this regard, the term "mounted on" indicates that the optical center of the camera 415 and/or its camera lens is parallel to or passes through plane 435. Plane 435, has a planar alignment relative to the HMD 400 that is similar (e.g., parallel) to the planar alignment of plane 430 relative to the HMD 400. These planes (430 and 435) are positioned/oriented relative to and parallel to a primary alignment of the HMD 400 (e.g., 445), such that planes 430 and 435 are horizontal planes when the HMD 400 is positioned in an upright primary alignment for use. However, during use, the HMD 400 will move with a user's head, such that the alignment of the HMD 400 will change. During such movement, planes 430 and 435 will also change at the same time that the primary alignment 445 of the HMD 400 changes, such that the images captured by the cameras (405, 410, 415) are captured from the perspective of the user's head alignment.

In other embodiments, planes 430 and 435 are coplanar, such that the three referenced cameras are all aligned on a same horizontal plane relative to the HMD.

While the foregoing example illustrates a parallel alignment between the first plane, the second plane and the primary alignment plane 445 of the HMD, it will be appreciated that other configurations are also possible. For instance, in some alternative embodiments (not shown), the first plane and the second plane are not parallel to each other and/or to the primary alignment of the HMD. In these alternative configurations, planes 430, 435, 445 may have fixed alignments, relative to each other, which are orthogonal to or at least angularly offset from one or both of the other two planes.

FIG. 4C depicts plane 435 as offset from plane 430 according to vertical offset 440. In this regard, the thermal camera 415 of the HMD 400 is configured, in some implementations, to capture thermal images from a perspective that is vertically offset from the perspectives of low light images captured by the left low light camera 405 and/or the right low light camera 410. Thus, in some instances, pixel disparities between a thermal image and a low light image captured by the HMD 400 are calculated in a non-horizontal direction (e.g., relative to the HMD 400). Thus, in some instances, thermal images captured by the thermal camera 415 provide a basis for at least partially compensating for the aperture problem described hereinabove.

Furthermore, in some instances, because the thermal camera 415 provides an additional perspective (e.g., additional to the perspectives of the left low light camera 405 and the right low light camera 410), thermal images captured by the thermal camera 415 provide a basis for at least partially compensating for the occlusion problem described hereinabove.

Although the description associated with FIG. 4C discusses the positioning of the thermal camera 415 relative to the left low light camera 405 and the right low light camera 410 in terms of planes 430 and 435 separated by an offset 440, those skilled in the art will appreciate, in view of the present disclosure, that the relative positioning of the cameras may be described in other ways. For instance, the camera center of the thermal camera 415 may be described as mounted on the HMD 400 at a position that is offset (e.g., vertically offset) from a line (e.g., a line along plane 430) that connects the camera center of the left low light camera 405 to the camera center of the right low light camera 410.

It should be noted that although FIGS. 4A-4C focus on a particular spatial configuration of the cameras of the HMD 400, the particular configuration of the cameras of the HMD 400 is illustrative only and non-limiting. For example, in some instances, the HMD 400 includes vertically arranged low light cameras (or cameras of other modalities) with a thermal camera (or a camera of another modality) that is horizontally offset from the low light cameras (relative to the HMD 400).

Figure 5:
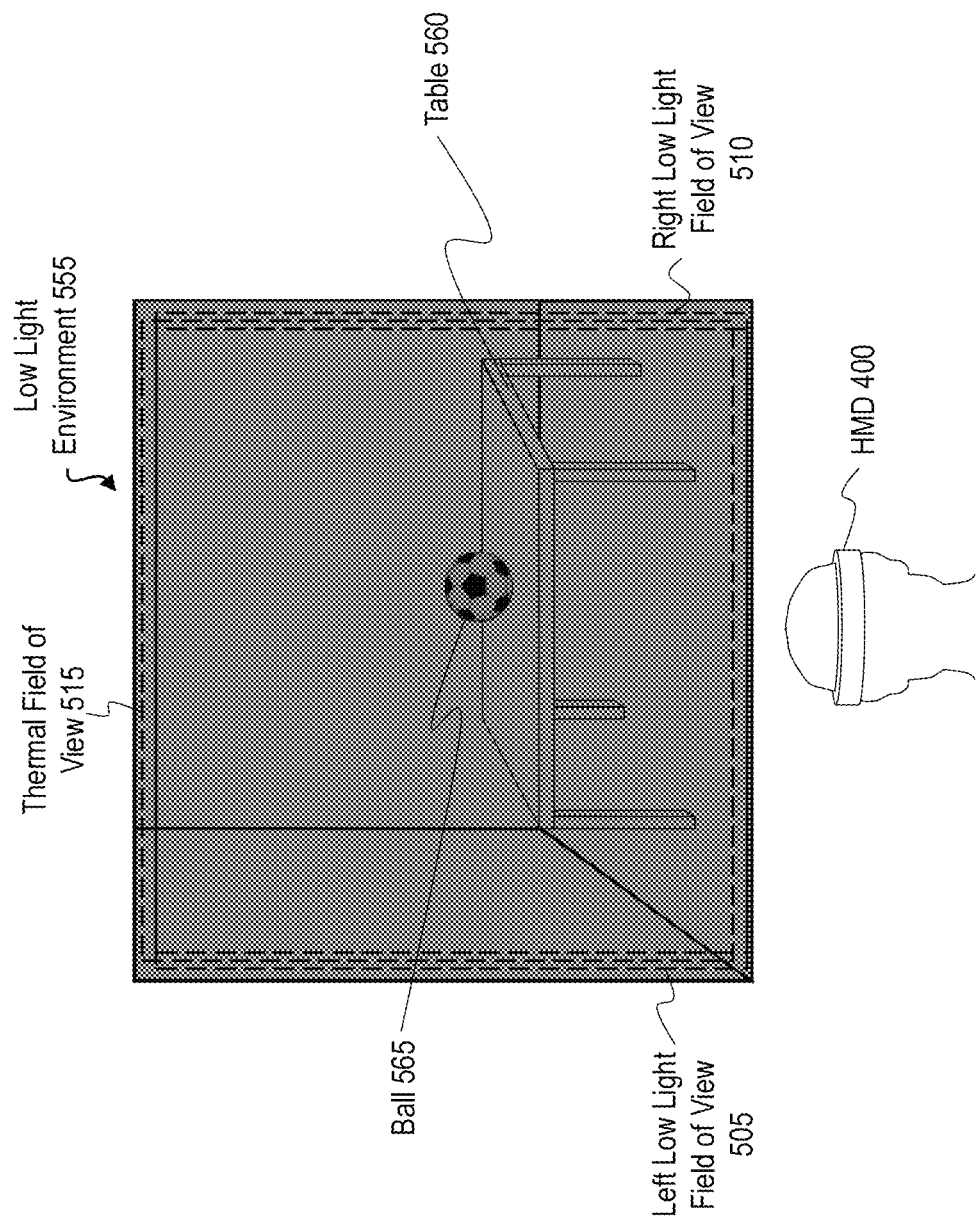
FIG. 5 illustrates an example of capturing an image of the environment with cameras of an HMD.

FIG. 5 illustrates an example of the HMD 400 capturing an image of a low light environment 555 with left low light camera 405, right low light camera 410, and thermal camera 415. To illustrate, and not obfuscate, the principles of the present disclosure, the low light environment 555 is a simple environment comprising a table 560 and a ball 565 positioned within a room of a building. One will appreciate, in view of the present disclosure, that the low light environment 555 is provided as an example only, and that the principles disclosed herein are not limited in any respect to operation in any particular environment and/or lighting condition.

As noted hereinabove, because the cameras of the HMD 400 are mounted to the HMD 400 at different positions, the perspectives of the cameras of the HMD 400 are at least slightly different from one another. For example, FIG. 5 illustrates a left low light field of view 505 associated with the left low light camera 405. FIG. 5 also illustrates a right low light field of view 510 associated with the right low light camera 410, which is horizontally offset from the left low light field of view 505 (e.g., according to a horizontal offset between the left low light camera 405 and the right low light camera 410 along plane 430 of the HMD 400 from FIG. 4C). Furthermore, FIG. 5 shows a thermal field of view 515 associated with the thermal camera 415, which is vertically offset from the left low light field of view 505 and the right low light field of view 510 (e.g., according to the vertical offset between the thermal camera 415 and plane 430 of the HMD 400 from FIG. 4C).

FIG. 6A illustrates an example of images of the low light environment 555 from FIG. 5 captured by the cameras of the HMD 400. For instance, FIG. 6A illustrates a left low light image 605 captured/generated using the left low light camera 405, a right low light image 610 captured/generated using the right low light camera 410, and a thermal image 615 captured/generated using the thermal camera 415.

In some instances, the left low light image 605 and the right low light image 610 appear to amplify ambient light in the low light environment 555, providing images that enable users to more accurately perceive objects in the low light environment 555 (e.g., as compared with unassisted user viewing of the low light environment 555). For instance, where a user may have difficulty perceiving the table 560 when viewing the low light environment 555 without assistance (see FIG. 5), a user may more easily perceive the table 660A represented in the left low light image 605 (see FIG. 6A).

Furthermore, in some instances, the thermal image 615 provides a visual representation of the heat signatures of objects in the low light environment 555. For instance, the table 660C of the thermal image 615 comprises a visual representation of the heat signature of the table 560 in the low light environment 555. In this regard, the textures represented in the thermal image 615 differ from the textures represented in the left low light image 605 and the right low light image 610.

As noted above, although the present disclosure focuses, in some respects, on a particular configuration of camera/image modalities (i.e., two low light cameras and one thermal camera), the disclosed embodiments are not limited to this configuration.

In some implementations, as noted above, a system (e.g., HMD 400, or another system) generates a sparse disparity map using the thermal image 615 and at least one of the left low light image 605 or the right low light image 610.

Figure 6B:
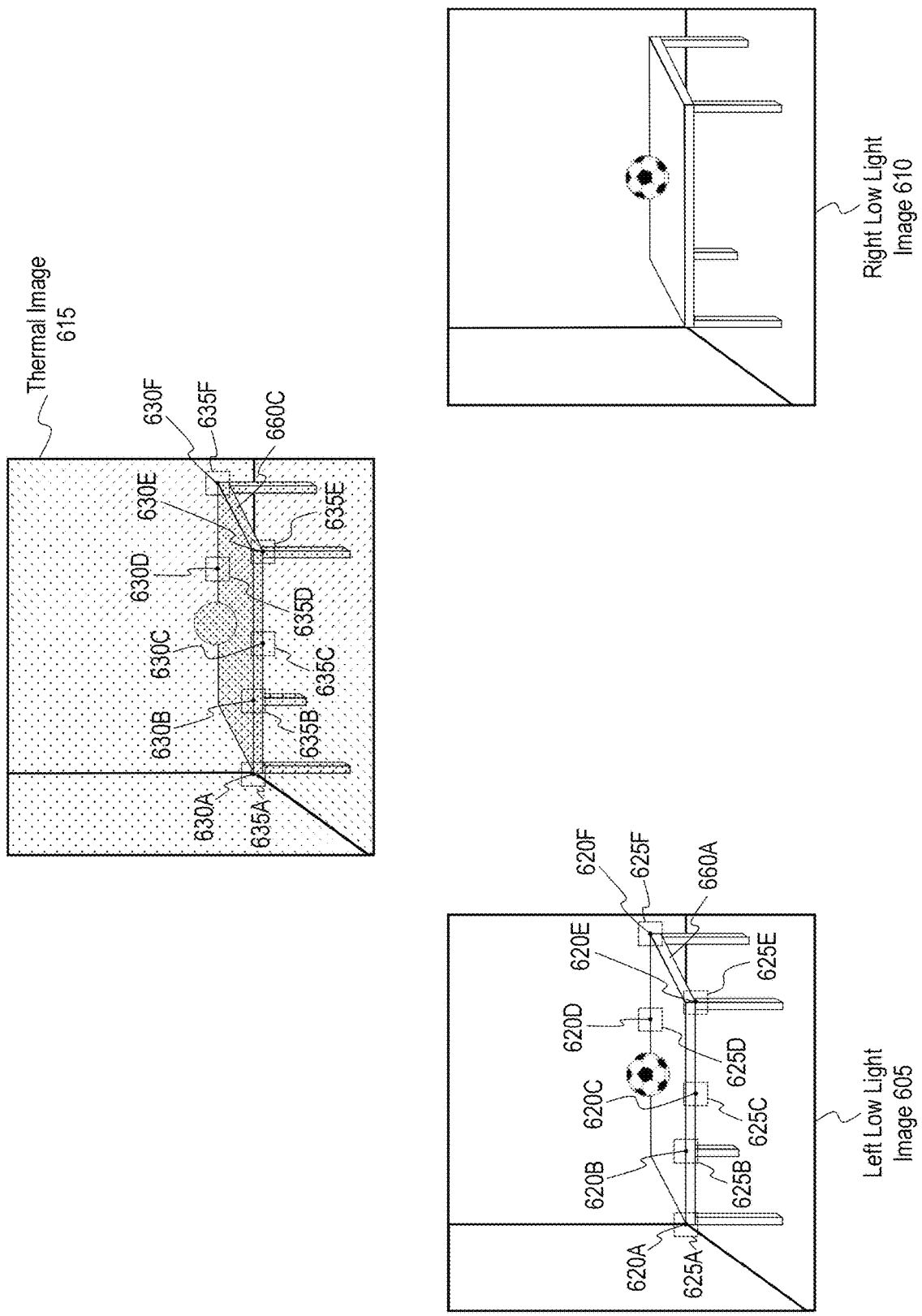
FIG. 6B illustrates an example of identifying feature points and feature descriptors of images of the environment from FIG. 6A.

FIG. 6B illustrates an example of identifying feature points and feature descriptors of the left low light image 605 and the thermal image 615. In some instances, a feature point (sometimes referred to as "keypoints," "points of interest," or simply "features") refers to a pixel within an image that comprises rich texture information, such as edges, corners, and/or other readily identifiable structures. In some instances, a feature descriptor (also referred to as a "feature vector") results from extracting image data/statistics from a local image/pixel patch around an identified feature point. A feature descriptor may operate as an identifier for the feature point about which the feature descriptor is centered. Various approaches exist for extracting feature descriptors, such as local histogram approaches, N-jets approaches, and/or others. For example, a feature descriptor may be identified based on a histogram of gradient magnitudes (e.g., changes in intensity and/or color) and/or orientations (e.g., edge orientations) for pixels within an image patch centered on a feature point.

A system may employ various techniques for identifying feature points and/or feature descriptors, such as, by way of non-limiting example, scale-invariant feature transform (SIFT), speeded up robust features (SURF), Canny operator, Kayyali operator, Moravec algorithm, Harris & Stephens/Shi-Tomasi algorithms, Förstner detector, smallest univalue segment assimilating nucleus (SUSAN) detector, level curve curvature approach, DAISY algorithms, and/or others.

FIG. 6B illustrates various feature points associated with the table 660A of the left low light image 605. For example, FIG. 6B illustrates feature points 620A, 620E, and 620F on corners of the table 660A. FIG. 6B also illustrates feature points 620B, 620C, and 620D on edges of the table 660A. Furthermore, FIG. 6B illustrates feature descriptors 625A, 625B, 625C, 625D, 625E, and 625F that are associated, respectively, with the feature points 620A, 620B, 620C, 620D, 620E, and 620F.

FIG. 6B also illustrates various feature points associated with the table 660C of the thermal image 615. For example, FIG. 6B illustrates feature points 630A, 630E, and 630F on corners of the table 660A. FIG. 6B also illustrates feature points 630B, 630C, and 630D on edges of the table 660A. Furthermore, FIG. 6B illustrates feature descriptors 635A, 635B, 635C, 635D, 635E, and 635F that are associated, respectively, with the feature points 630A, 630B, 630C, 630D, 630E, and 630F.

As is evident in FIG. 6B, although the thermal image 615 and the left low light image 605 are captured using cameras of different modalities (e.g., thermal camera 415 and left low light camera 405 from FIGS. 4A-4C, respectively), the feature points 630A-630F and feature descriptors 635A-635F of the table 660C within the thermal image 615 correspond to the feature points 620A-620F and feature descriptors 625A-625F of the table 660A within the left low light image 605. Put differently, the feature points 630A-630F of the table 660C within the thermal image 615 and the feature points 620A-620F within the left low light image 605 represent, respectively, the same 3D points of the captured environment (e.g., low light environment 555 from FIG. 5). This is possible, in some instances, because the real-world features represented by the feature points (e.g., edges and corners of the table 560 from FIG. 5) are prominent enough to be identifiable in different images captured by cameras of different modalities (e.g., thermal and low light).

However, it should be noted that, in some instances, at least some feature points that are present/identifiable in one image may not be present/identifiable in another image, even where the different images are captured using the same camera modality (e.g., because of occlusions). Furthermore, in some instances, an image captured using a camera of one modality may fail to represent certain features that are represented in an image captured using a camera of a different modality. For example, a thermal image may fail to capture edges and/or corners of a portion of an environment that are isothermal, whereas a low light image may capture such edges and/or corners.

Figure 6C:
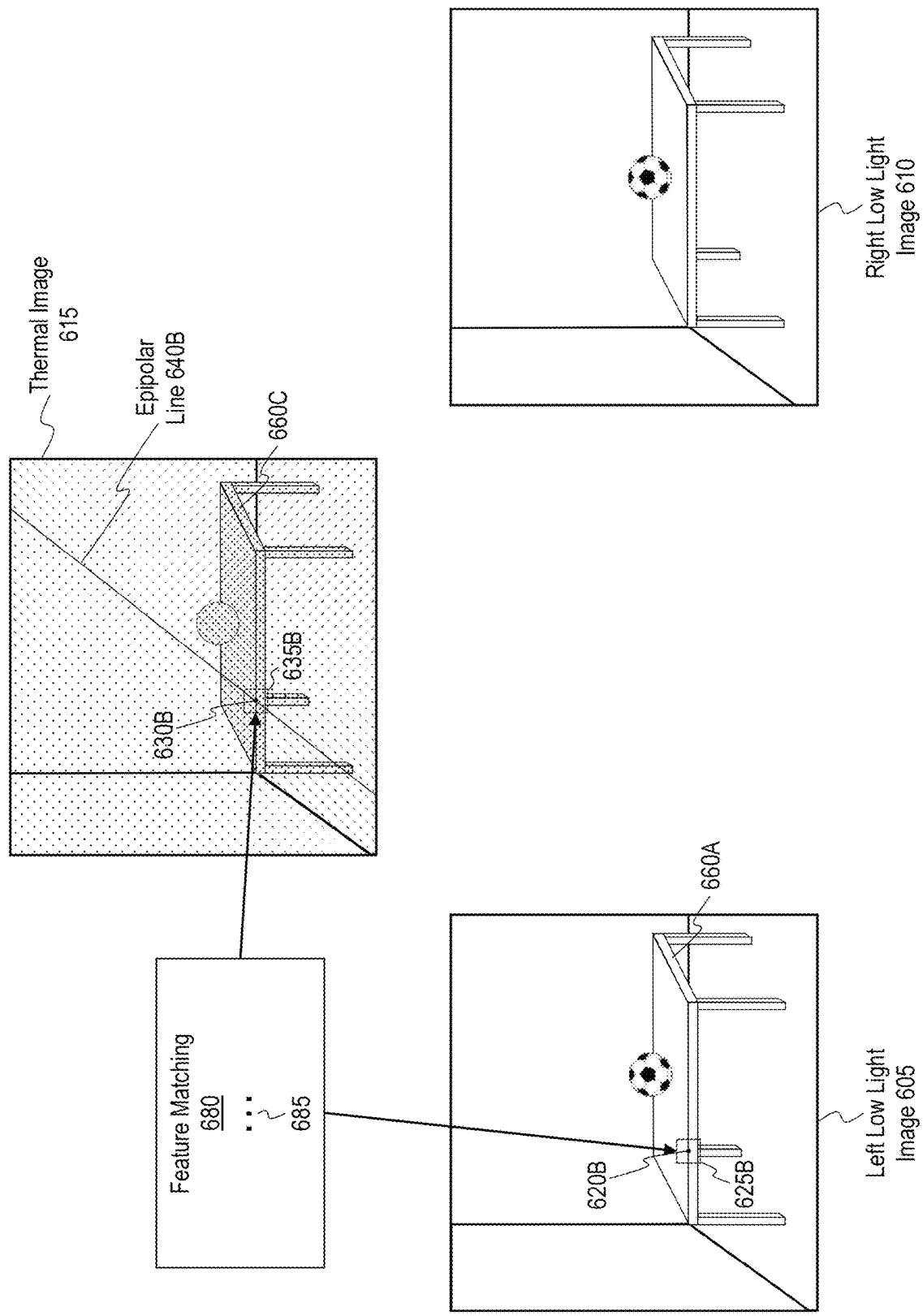
FIG. 6C illustrates an example of performing feature matching on images of the environment from FIG. 6A.

Attention is now directed to FIG. 6C, which illustrates an example of performing feature matching 680 to identify features points within the left low light image 605 and the thermal image 615 that correspond to one another (i.e., that represent the same 3D points of the low light environment 555 from FIG. 5). For clarity, FIG. 6C focuses on performing feature matching 680 to identify a single feature point within the thermal image 615 (i.e., feature point 630B) that corresponds to a single feature point within the left low light image 605 (i.e., feature point 620B). However, those skilled in the art will recognize, in view of the present disclosure, that a system may perform feature matching 680 to find any number of feature points within the thermal image 615 that correspond to feature points within the left low light image (e.g., as indicated in FIG. 6C by the ellipsis 685).

FIG. 6C illustrates that, in some instances, performing feature matching 680 to identify the feature point 630B in the thermal image 615 that corresponds to the feature point 620B in the left low light image 605 includes identifying an epipolar line 640B in the thermal image 615. In some instances, an epipolar line may be conceptualized, using pinhole camera terminology, as a projection of a ray associated with a pixel of a first camera onto the front image plane of a second camera. The ray may extend from the optical center of the first camera through the pixel as it lies on the front image plane of the first camera. In this regard, an epipolar line may depend on the relative positions of the two cameras and the coordinates of the pixel in the first camera associated with the ray. Therefore, separate pixels of an image from the first camera may be associated with separate epipolar lines on the front image plane of the second camera (although it is possible for separate epipolar lines to overlap).

For a feature point of a first camera image, a corresponding feature point in a second camera image (i.e., a feature point in the second camera image that describes the same 3D point of the environment as the feature point of the first camera image) will lie along the epipolar line in the second camera image. In this regard, the epipolar line may define a search range for identifying feature points in an image captured by one camera that correspond to feature points in an image captured by another camera. Using an epipolar line to define a search range for identifying corresponding feature points may improve computational efficiency, as compared with searching for corresponding feature points across the whole image.

Referring again to FIG. 6C, in some instances, a system (e.g., HMD 400 or another system) performs feature matching 680 to identify a feature point in the thermal image 615 that corresponds to feature point 620B in the left low light image 620B by identifying epipolar line 640B in the thermal image 615. For example, a system may identify epipolar line 640B by casting a ray from the optical center of the left low light camera 405 (at the capture pose) through the feature point 620B as it lies on a front image plane of the left low light camera 405 (at the capture pose) and projecting the ray onto the front image plane of the thermal camera 415 (at the capture pose). In some instances, the system (e.g., HMD 400) searches along epipolar line 640B for an image patch (e.g., feature descriptor) that has a highest correspondence with the image patch centered around the feature point 620B (e.g., feature descriptor 625B). For example, in some instances, the system determines by searching along epipolar line 640B that feature descriptor 635B of the thermal image 615 has a highest correspondence with feature descriptor 625B of the left low light image 605. Accordingly, in some instances, the system determines that feature point 630B (associated with feature descriptor 635B) corresponds to feature point 620B (associated with feature descriptor 625B).

Although FIG. 6C illustrates epipolar line 640B as extending from one boundary of the thermal image 615 to another boundary thereof, it should be noted that, in some instances, an epipolar line, or a search range thereon, is constrained in based on the relative positions of the left low light camera 405 and the thermal camera 415 (e.g., a predefined maximum disparity value based on the relative positions of the left low light camera 405 and the thermal camera 415). Such constraints may further improve computational efficiency by reducing the search range for identifying corresponding feature points.

As noted above, a system may perform feature matching 680 to find any number of feature points within the thermal image 615 that correspond to feature points within the left low light image (e.g., as indicated in FIG. 6C by the ellipsis 685). For example, a system may identify a set of epipolar lines within the thermal image 615 based on a set of feature points of the left low light image 605 (e.g., feature points 620A-620F from FIG. 6B). The system may also search along the epipolar lines in the thermal image 615 to identify a set of corresponding feature descriptors in the thermal image 615 (e.g., feature descriptors 635A-635F from FIG. 6B) that correspond to feature descriptors associated with the set of feature points of the left low light image 605 (e.g., feature descriptors 625A-625F from FIG. 6B).

In some instances, each separate corresponding feature descriptor in the thermal image 615 is associated with a separate epipolar line of the set of epipolar lines in the thermal image 615. Furthermore, in some instances, each separate corresponding feature descriptor in the thermal image 615 corresponds to a separate feature descriptor of the set of feature descriptors of the left low light image 605. The system may furthermore identify a set of corresponding feature points in the thermal image 615 (e.g., feature points 630A-630F) from the set of corresponding feature descriptors in the thermal image 615 (e.g., feature descriptors 635A-635F). In some instances, each separate corresponding feature point of the thermal image 615 (e.g., feature points 630A-630F) corresponds to a separate feature point of the left low light image 605 (e.g., feature points 620A-620F).

Although not explicitly shown, in some instances, a system may fail to identify a corresponding feature point in one image for one or more a feature point in another image (e.g., because of occlusion, modality differences, structures in direction of epipolar line, etc.). Accordingly, at least some embodiments of the present disclosure do not require a corresponding feature point in one image to be found for all feature points identified in another image.

FIGS. 6A-6C have disclosed implementations in which a system performs feature matching 680 by identifying feature points and feature descriptors in both the left low light image 605 and thermal image 615 and subsequently matching the identified feature points of the two images. In some implementations, a system (e.g., HMD 400 or another system) performs feature matching 680 by identifying feature points and feature descriptors in the left low light image 605 (which may have higher resolution than the thermal image 615) and identifying epipolar lines in the thermal image 615, without first identifying feature points and feature descriptors in the thermal image 615. The system also searches along the epipolar lines in the thermal image 615 for image/pixel patches that have a highest correspondence with the feature descriptors of the left low light image 605. The system identifies pixels within the image/pixel patches of the thermal image 615 as feature points within the thermal image 615 that correspond to feature points of the left low light image 605. In this regard, in some instances, a system may combine steps of identifying feature points in the thermal image 615 and matching feature points of the thermal image 615 with feature points of the left low light image 605.

Although FIG. 6C focuses on using epipolar lines to identify matching feature points in the left low light image 605 and the thermal image 615, some implementations of the present disclosure utilize a different approach for identifying matching feature points. For example, at least one alternative approach includes applying rectification to the left low light image 605 and the thermal image 615, such that corresponding/matching pixel in the two images (e.g., pixels in the two images that represent a common 3D point in the environment) are arranged along scanlines and only differ from one another in one dimension. A system may then search along the scanlines for matching pixels. However, it should be noted that, in some instances, utilizing epipolar lines rather than image rectification requires fewer computational resources, in particular because the system only searches for matches in the thermal image 615 for the feature points of the left low light image 605 (rather than every pixel of the left low light image 605).

In addition, although FIG. 6C focuses, in some respects, on using epipolar lines in the thermal image 615 to identify feature points in the thermal image 615 that correspond to feature points in the left low light image 605, those skilled in the art will recognize, in view of the present disclosure, that a system may use epipolar lines in the left low light image 605 to identify feature points in the left low light image 605 that correspond to feature points in the thermal image 615.

Figure 6D:
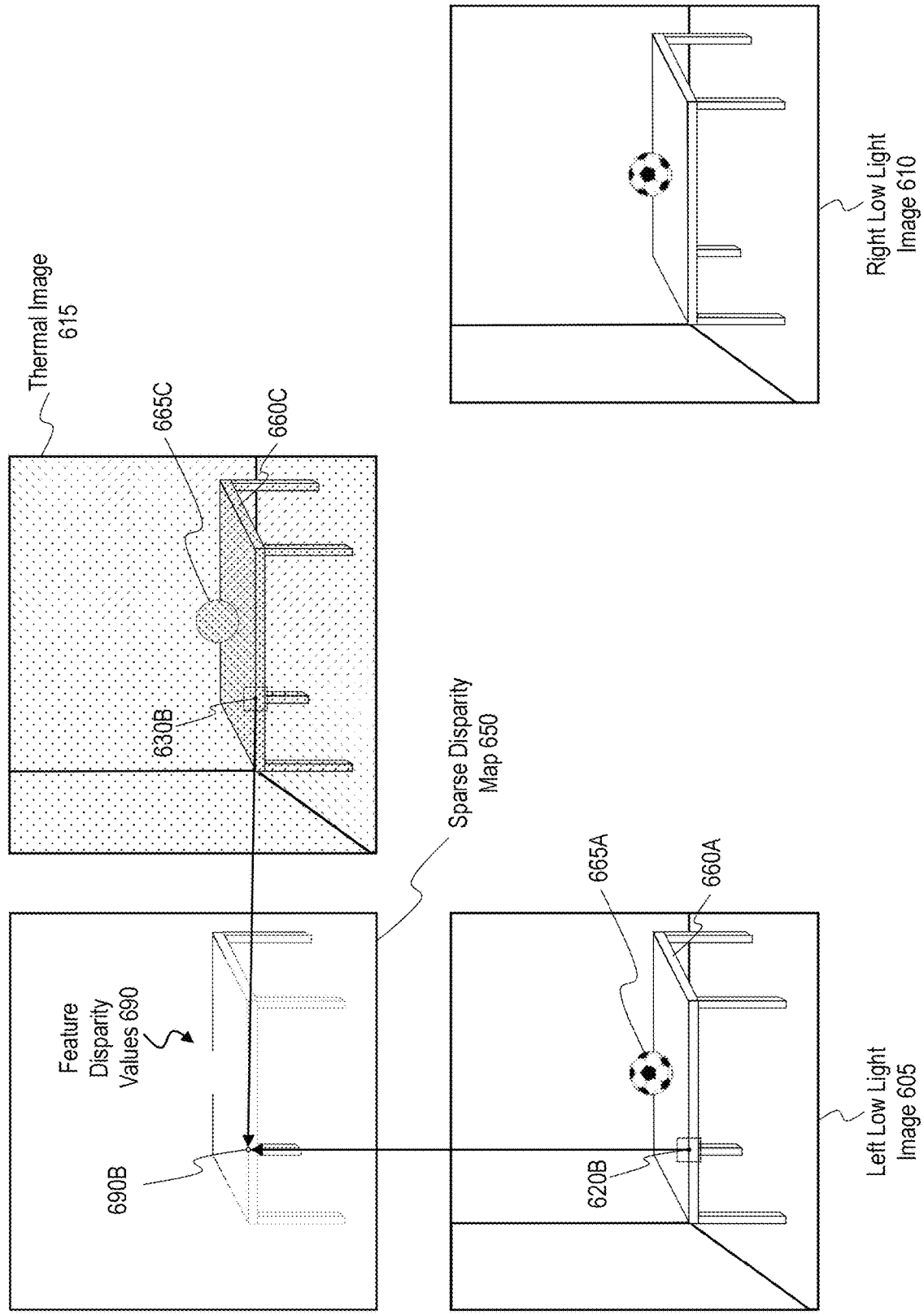
FIG. 6D illustrates an example of generating a sparse disparity map based on images of the environment from FIG. 6A.

FIG. 6D illustrates an example of generating a sparse disparity map 650 based on the matched feature points of the left low light image 605 and the thermal image 615. The sparse disparity map 650 of FIG. 6D includes feature disparity values 690. In some implementations, a system (e.g., HMD 400) identifies the feature disparity values 690 based on matched pairs of feature points in the left low light image 605 and corresponding feature points in the thermal image 615. To illustrate, and for clarity, FIG. 6D focuses on feature disparity value 690B, which is identified based on feature point 620B in the left low light image 605 and corresponding feature point 630B in the thermal image 615.

As indicated above, in some instances, a disparity value is related to a displacement between pixel coordinates of matched pixels in different images (captured from different perspectives) that represent the same 3D point of an environment. In one example, the displacement between the pixel coordinates of feature point 620B relative to the left low light image 605 and the pixel coordinates of corresponding feature point 630B relative to the thermal image 615 provides feature disparity value 690B, which a system may implement into the sparse disparity map 650 (as illustrated in FIG. 6D by the lines extending from feature point 620B and feature point 630B to feature disparity value 690B). FIG. 6D also illustrates that the sparse disparity map 650 may include feature disparity values 690 for all identified features of the left low light image 605 that include an identified corresponding/matching feature point in the thermal image 615.

In this regard, in some instances, a sparse disparity map 650 includes feature disparity values 690 for portions of the captured environment (e.g., low light environment 555 from FIG. 5) that provide rich texture (e.g., edges and corners). For instance, FIG. 6D illustrates that, in some instances, the sparse disparity map 650 includes feature disparity values 690 for edges and/or corners of the table 560 from FIG. 5, as identified as feature points in the left low light image 605 (table 660A) and the thermal image 615 (table 660C).

FIG. 6D also illustrates that, in some instances, a sparse disparity map 650 omits feature disparity values 690 for at least some portions of the captured environment (e.g., low light environment 555 from FIG. 5). By way of conceptual example, FIG. 6D illustrates that the sparse disparity map 650 omits feature disparity values 690 for portions of the ball 565 from FIG. 5, such as portions for which no feature points were identified according to the left low light image 605 (ball 665A) and the thermal image 615 (ball 665C). Accordingly, in some implementations, a system may generate a sparse disparity map 650 without attempting to obtain a feature disparity value 690 for every pixel. Instead, a system may focus on obtaining feature disparity values 690 for pixels that are identified as being associated with feature points, thereby reducing computational burden associated with generating the sparse disparity map 650.

Although FIGS. 6A-6D focus on implementations in which a system identifies features from the left low light image 605 and the thermal image 615 and generates a sparse disparity map 650 based on the identified features, one will appreciate, in view of the present disclosure, that a system may instead identify features from the right low light image 610 and the thermal image and generate a sparse disparity map 650 based on the identified features.

Figure 7A:
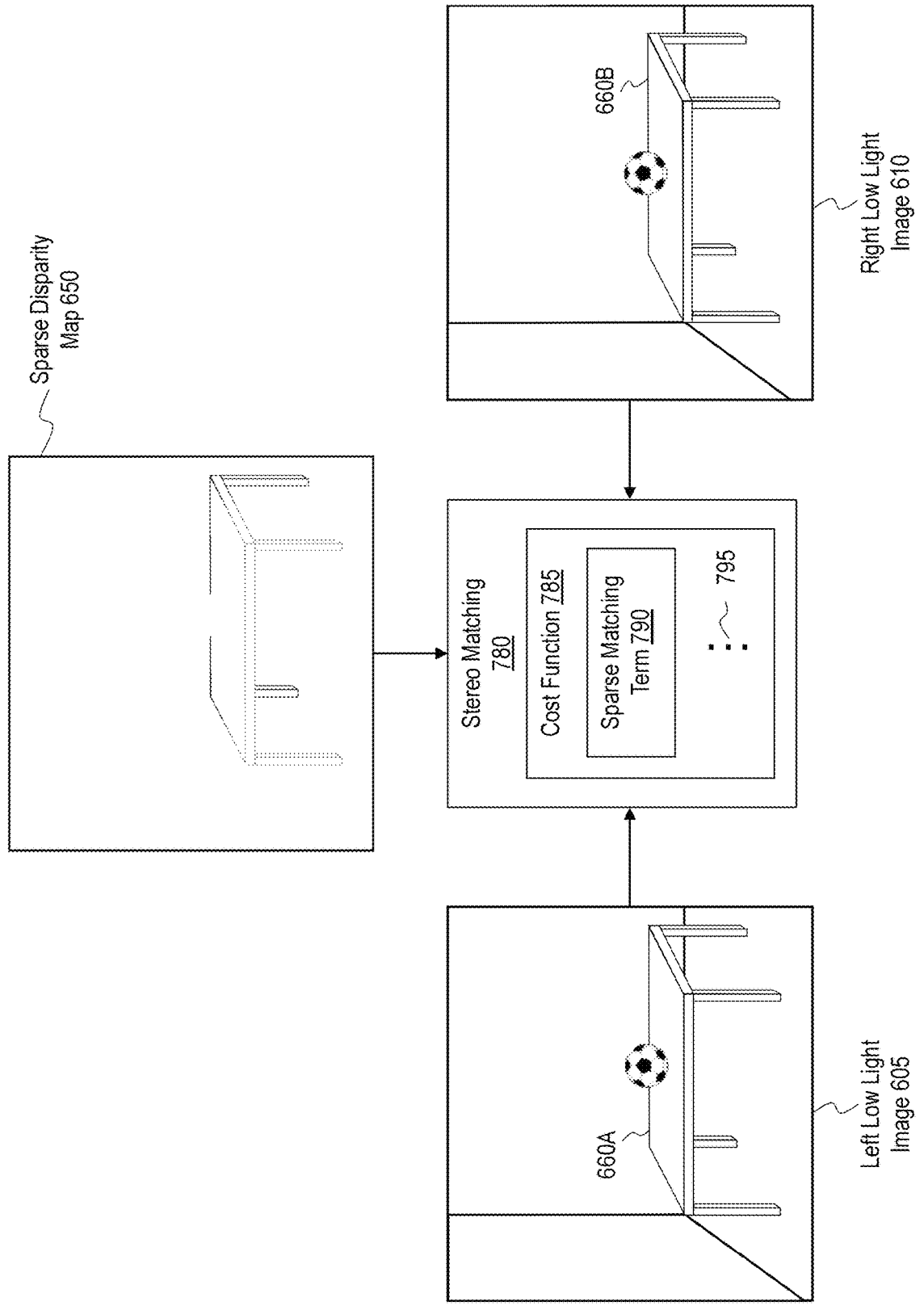
FIGS. 7A and 7B illustrate an example of generating a dense disparity map based on the sparse disparity map from FIG. 6D and images of the environment from FIG. 6A.
Figure 7B:
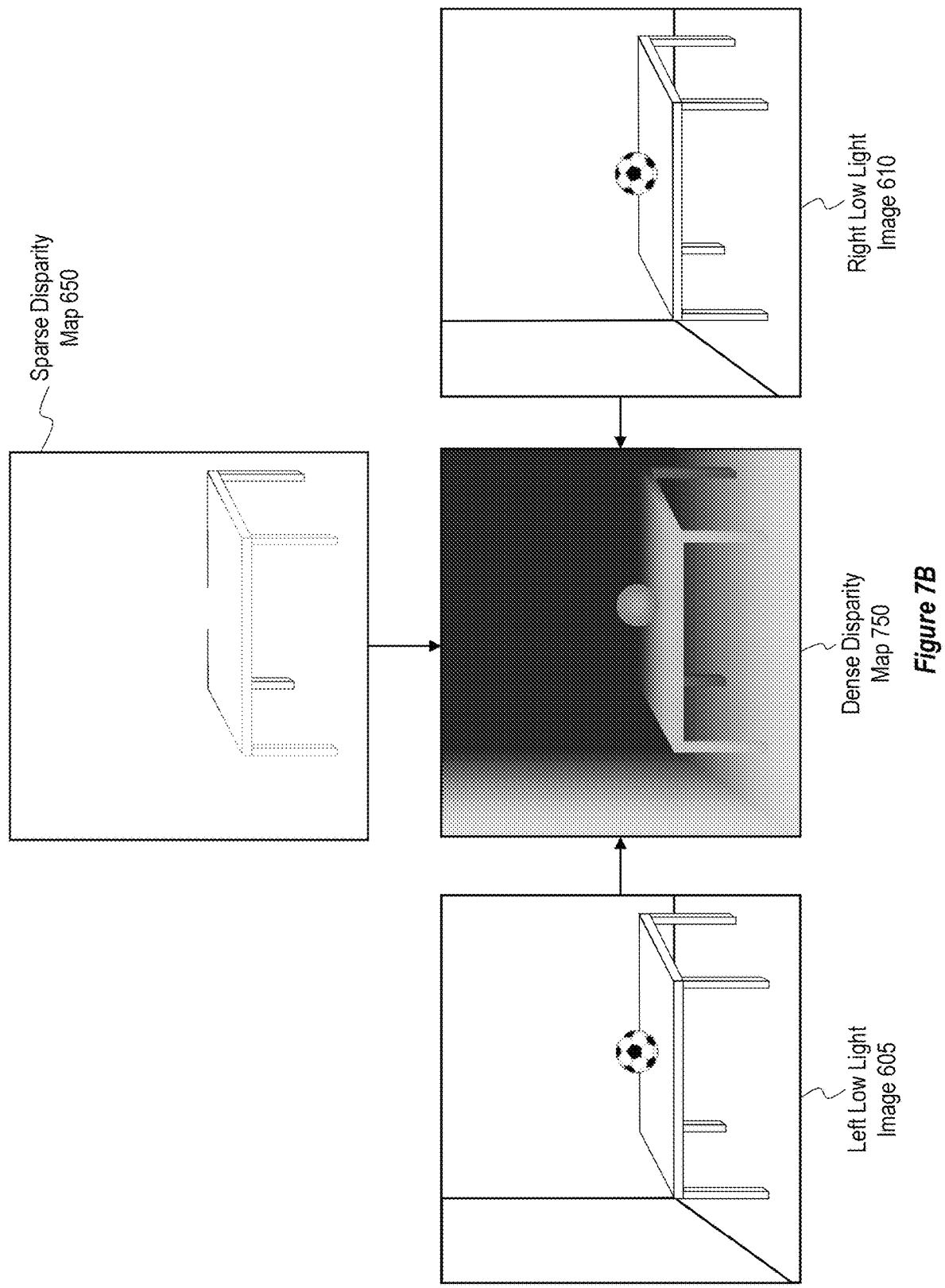

FIGS. 7A and 7B illustrate an example of generating a dense disparity map 750 (see FIG. 7B) based on the sparse disparity map 650 described hereinabove with reference to FIG. 6D. FIG. 7A illustrates that, in some implementations, a system (e.g., HMD 400 or another system) applies the left low light image 605, the right low light image 610, and the sparse disparity map 650 as inputs for generating a dense disparity map 750. FIG. 7A furthermore illustrates that, in some implementations, a system performs a stereo matching operation 780 to apply the left low light image 605, the right low light image 610, and the sparse disparity map 650 as inputs for generating a dense disparity map 750.

In some instances, as illustrated in FIG. 7A, the stereo matching operation 780 generates the dense disparity map 750 by using a cost function 785 (or other similarity measure) to determine the cost at every pixel location for relevant disparities. For every pixel location, in some instances, the stereo matching operation 780 selects the disparity value that has the overall minimum cost.

In some instances, a cost function 785 of a stereo matching operation 780 implements various terms and/or optimizations to determine the cost at every pixel location, such as a data term, a smoothness term, a semi-global accumulation scheme, a continuity term, consistency checks, coarse-to-fine, and/or others, indicated in FIG. 7A by the ellipsis 795.

The cost function 785 of the stereo matching operation 780 implements a sparse matching term 790. In some implementations, the sparse matching term 790 of the cost function 785 applies a cost penalty (e.g., a cost increase) for pixels (or pixel locations) of the dense disparity map 750 that fail to share a same or similar disparity value with corresponding pixels (or pixel locations) of the sparse disparity map 650 (e.g., for pixels of the dense disparity map 750 that have a corresponding pixel in the sparse disparity map 650 that includes a feature disparity value 690).

The sparse matching term 790 will, in some instances, cause the pixels of the dense disparity map 750 to have a minimum cost by adopting a corresponding feature disparity value 690 from the sparse disparity map 650 that describes the same 3D point of the environment (or a disparity value that is similar to the corresponding feature disparity value 690). This may occur, for example, in situations where pixel (or patch) matching between the left low light image 605 and the right low light image 610 (e.g., after rectification) provides a disparity value that is different than a corresponding feature disparity value 690 from the sparse disparity map 650. Furthermore, this may occur where pixel (or patch) matching fails to identify a disparity value for a pixel, or fails to identify a disparity value for the pixel with a sufficient degree of confidence and/or precision (e.g., by reason of the aperture problem and/or the occlusion problem).

By way of illustrative example, consider the table 560 from FIG. 5, which is represented in the left low light image 605 as table 660A and in the right low light image 610 as table 660B. Applying conventional pixel/patch matching techniques to the left low light image 605 and the right low light image 610 may identify a disparity value for a pixel that represents a horizontal edge of the table 560 that is different than a corresponding feature disparity value 690 of the sparse disparity map 650 (e.g., because of the aperture problem). In other instances, conventional pixel/patch matching techniques may fail to accurately identify a pixel patch for a horizontal edge of table 660B in the right low light image 610 that correspond to a pixel patch for the horizontal edge of table 660A in the left low light image 605, thereby resulting in a failure to obtain a disparity value.

Thus, the cost function 785 of the stereo matching operation 780 includes the sparse matching term 790 that may provide a cost penalty (e.g., cost increase) for pixels of the dense disparity map 750 that fail to share a same or similar disparity value with feature disparity values 690 of corresponding pixels of the sparse disparity map 650 (where such corresponding pixels exist in the sparse disparity map 650). Continuing with the above example, the cost function 785 may determine that the cost associated with disparity values for pixels that describe the horizontal edges of the table 560 is lower (e.g., as compared to disparities obtained by conventional pixel/patch matching) when the pixels adopt the feature disparity values 690 of corresponding pixels of the sparse disparity map 650 (e.g., because of the cost penalty associated with the sparse matching term 790). Accordingly, the cost penalty may be used to selectively determine which feature disparity values are actually adopted from the sparse disparity map for inclusion in the dense disparity map.

In some instances, by defining disparity values of the dense disparity map 750 based on corresponding feature disparity values 690 from the sparse disparity map 650, noise may be reduced and precision may be increased in the dense disparity map 750 (e.g., as compared with a dense disparity map that would result from performing conventional stereo matching operations for all pixels without a sparse matching term 790). An improved dense disparity map 750 may improve user experiences that depend on the dense disparity map 750 (e.g., by reducing artifacts in parallax-corrected images).

It should be noted that, in some instances, adopting a feature disparity value 690 from the sparse disparity map 650 would contravene a strong signal in the left low light image 605 and the right low light image 610 that indicates a disparity value that is more accurate (e.g., provides an even lower cost) than adopting the a feature disparity value 690 (even after considering the cost penalty of the sparse matching term 790). For example, in some situations, applying the cost penalty of the sparse matching term 790 to a disparity obtained by conventional pixel/patch matching provides a disparity with lower cost than a cost that would exist for the pixel by adopting a corresponding feature disparity value 690. Thus, in some situations, the stereo matching operation 780 may ignore the corresponding feature disparity value 690 for that pixel and select the disparity value based on pixel (or patch) matching.

However, those skilled in the art will recognize, in view of the present disclosure, that situations where a system refrains from implementing a corresponding feature disparity value 690 from a sparse disparity map 650 may be avoided by defining the cost penalty associated with the sparse matching term 790 to be sufficiently high (e.g., infinite cost). Such implementations may be thought of as applying the sparse disparity map 650 as a hard constraint in generating the dense disparity map 750, thereby causing all pixels of the dense disparity map that have a corresponding feature disparity value 690 in the sparse disparity map 650 to implement the corresponding feature disparity value 690.

Furthermore, it should be noted that, in some implementations, the sparse matching term 790 is configured to apply a cost bonus, rather than a cost penalty as described above, to influence whether pixels of the dense disparity map 750 adopt corresponding feature disparity values 690 of the sparse disparity map 650.

FIG. 8 illustrates that, in some instances, a system (e.g., HMD 400 or another system) applies a sparse disparity map 650 to generate a dense disparity map 750 in additional or alternative ways. Specifically, FIG. 8 illustrates an example of a system applying spatial filtering 830 to identify disparity values for one or more pixels of the dense disparity map 750.

FIG. 8 illustrates a pixel 810 of the dense disparity map 750 for which the stereo matching operation 780 from FIG. 7A failed to obtain a disparity value (e.g., because of the occlusion problem). Pixel 810 represents of an edge of the table 560 from FIG. 5 that may have been visible from the perspective of the left low light camera 405 but occluded from the perspective of the right low light camera 410 and the thermal camera 415.

FIG. 8 illustrates an implementation in which a system identifies a window of pixel coordinates 815A that surrounds the pixel 810 of the dense disparity map 750. The system also identifies a corresponding window of pixel coordinates 815B in the sparse disparity map 650 and identifies feature disparity values 690 of pixels within the corresponding window of pixel coordinates 815B.

FIG. 8 illustrates that, in some instances, the system performs spatial filtering 830 using the feature disparity values 690 of pixels within the corresponding window of pixel coordinates 815B of the sparse disparity map 650 to generate a disparity value for the pixel 810 of the dense disparity map 750. For example, a system may apply a median filter, a mean filter, and/or any other type of spatial filter to generate the disparity value for pixel 810 based on the feature disparity values 690 of pixels within the corresponding window of pixel coordinates 815B. It should be noted that, although not explicitly depicted in FIG. 8, spatial filtering 830 for generating a disparity value for pixel 810 may also utilize disparity values of one or more pixels within the window of pixel coordinates 815A of the dense disparity map 750 that surround pixel 810. Other algorithms for applying a sparse disparity map 650 (in addition to a stereo pair of images) to generate a dense disparity map are also within the scope of the present disclosure.

Example Method(s) for Dense Depth Computations Aided by Sparse Feature Matching

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
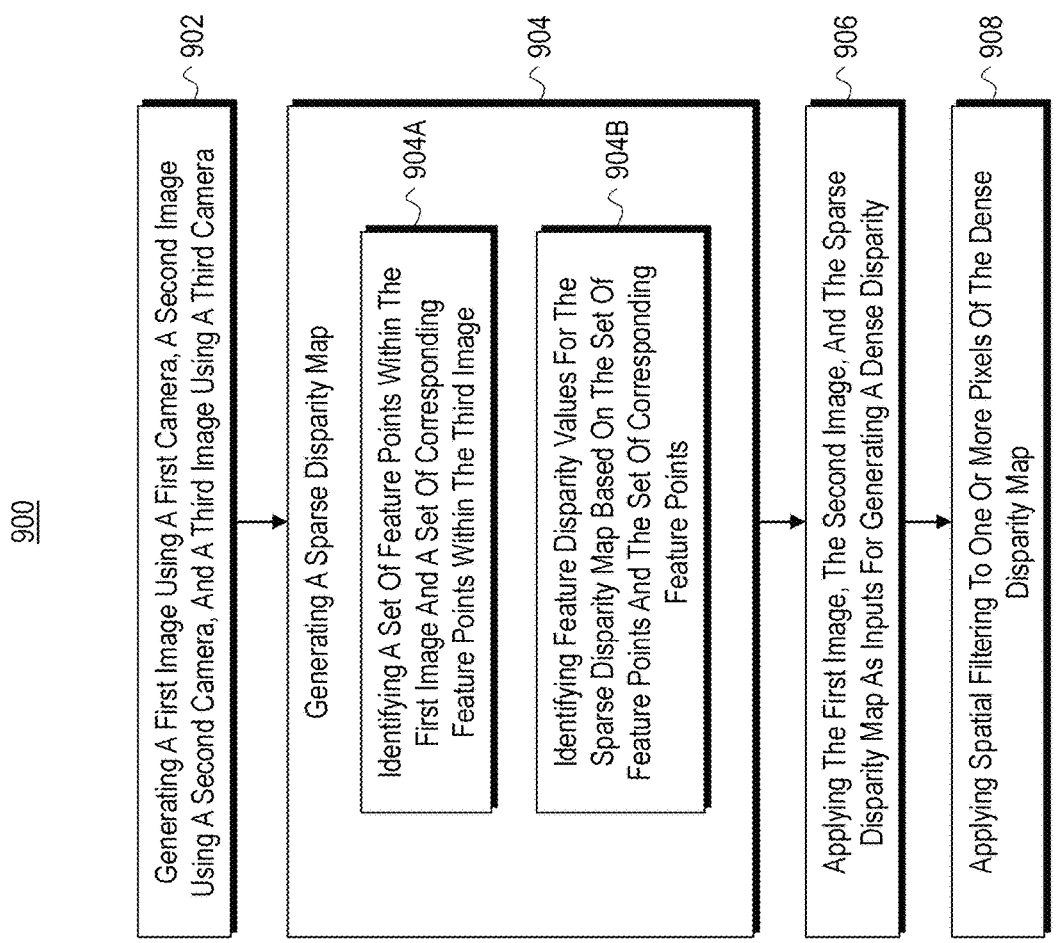
FIG. 9 illustrates an example flow diagram depicting acts associated with dense depth computations aided by sparse feature matching.

FIG. 9 illustrates an example flow diagram 900 depicting acts associated with dense depth computations aided by sparse feature matching. The discussion of the various acts represented in flow diagram 900 includes references to various hardware components described in more detail with reference to FIGS. 2, 4A-4C, and 10.

Act 902 of flow diagram 900 includes generating a first image using a first camera, a second image using a second camera, and a third image using a third camera. Act 902 is performed, in some instances, using one or more scanning sensor(s) 205 of an MR system (e.g., any HMD described herein), such as visible light camera(s) 210, low light camera(s) 215, thermal imaging camera(s) 220, NIR camera(s), UV camera(s) 225, time of flight camera(s), etc. For example, in some instances, the first camera is implemented as a left low light camera 405 of an HMD 400, the second camera is implemented as a right low light camera 410 of the HMD 400, and the third camera is implemented as a thermal camera 415 of the HMD 400.

In some implementations, the first camera and the second camera are arranged along a first plane associated with and relative to the system, whereas the third camera is positioned on a second plane that is associated with and relative to the system and that is offset from the first plane (e.g., vertically offset from the first plane). In some instances, the first plane and the second plane are parallel relative to each other. In some instances, the first plane and the second plane are also parallel relative to a primary alignment plane of the HMD. In other, alternative embodiments, the first plane and the second plane are not parallel to each other and/or the primary alignment of the HMD (being orthogonal to or at least angularly offset from the planar alignment of each of the other's planar orientation).

Act 904 of flow diagram 900 includes generating a sparse disparity map. Act 904 is performed, in some instances, using processor(s) 1005 of a computer system 1000 (e.g., any HMD described herein). In some instances, a system generates a sparse disparity map using the first image captured by the first camera and the third image captured by the third camera. Act 904 may include various sub-acts, such as act 904A and act 904B, described below.

Act 904A includes identifying a set of feature points within the first image and a set of corresponding feature points within the third image. For example, a feature point in the first image and a corresponding feature point in the third image both describe the same 3D point within a captured environment. In some instances, act 904A includes identifying a set of feature descriptors for the set of feature points of the first image, identifying a set of epipolar lines within the third image based on the set of feature points of the first image, and identifying a set of corresponding feature descriptors within the third image. In some instances, each separate corresponding feature descriptor is associated with a separate epipolar line of the set of epipolar lines. Furthermore, in some instances, each separate corresponding feature descriptor of the third image corresponds to a separate feature descriptor of the set of feature descriptors of the first image.

Act 904B includes identifying feature disparity values for the sparse disparity map based on the set of feature points and the set of corresponding feature points. In some instances, a disparity value is related to a displacement between pixel coordinates of feature points of the set of feature points of the first image and corresponding feature points of the set of corresponding feature points of the third image.

Act 906 of flow diagram 900 includes applying the first image, the second image, and the sparse disparity map as inputs for generating a dense disparity. Act 906 is performed, in some instances, using processor(s) 1005 of a computer system 1000 (e.g., any HMD described herein). In some implementations, generating a dense disparity map includes implementing a sparse matching term into a cost function for performing stereo matching on the first image and the second image. For example, in some instances, the sparse matching term applies a cost penalty for pixels of the dense disparity map that fail to share a same or similar disparity value with corresponding pixels of the sparse disparity map (e.g., corresponding pixels of the sparse disparity map that describe the same 3D points of a captured environment). In some instances, disparity values having a lowest cost are included in the dense disparity map.

In some implementations, the cost penalty causes pixels of the dense disparity map that correspond to a corresponding feature disparity value of the sparse disparity map to implement the corresponding feature disparity value from the sparse disparity map (which may be conceptualized as a hard constraint).

Act 908 of flow diagram 900 includes applying spatial filtering to one or more pixels of the dense disparity map. Act 908 is performed, in some instances, using processor(s) 1005 of a computer system 1000 (e.g., any HMD described herein). In some implementations, generating the dense disparity map includes, for at least a particular pixel of the dense disparity map, identifying a plurality of pixel coordinates for pixels of the dense disparity map that are proximate to the particular pixel. Generating the dense disparity map may also include identifying one or more pixels of the sparse disparity map at the pixel coordinates of the plurality of pixel coordinates. Also, generating the dense disparity map may include generating a disparity value for the particular pixel based on the one or more pixels of the sparse disparity map.

Example Computer System(s)

Figure 10:
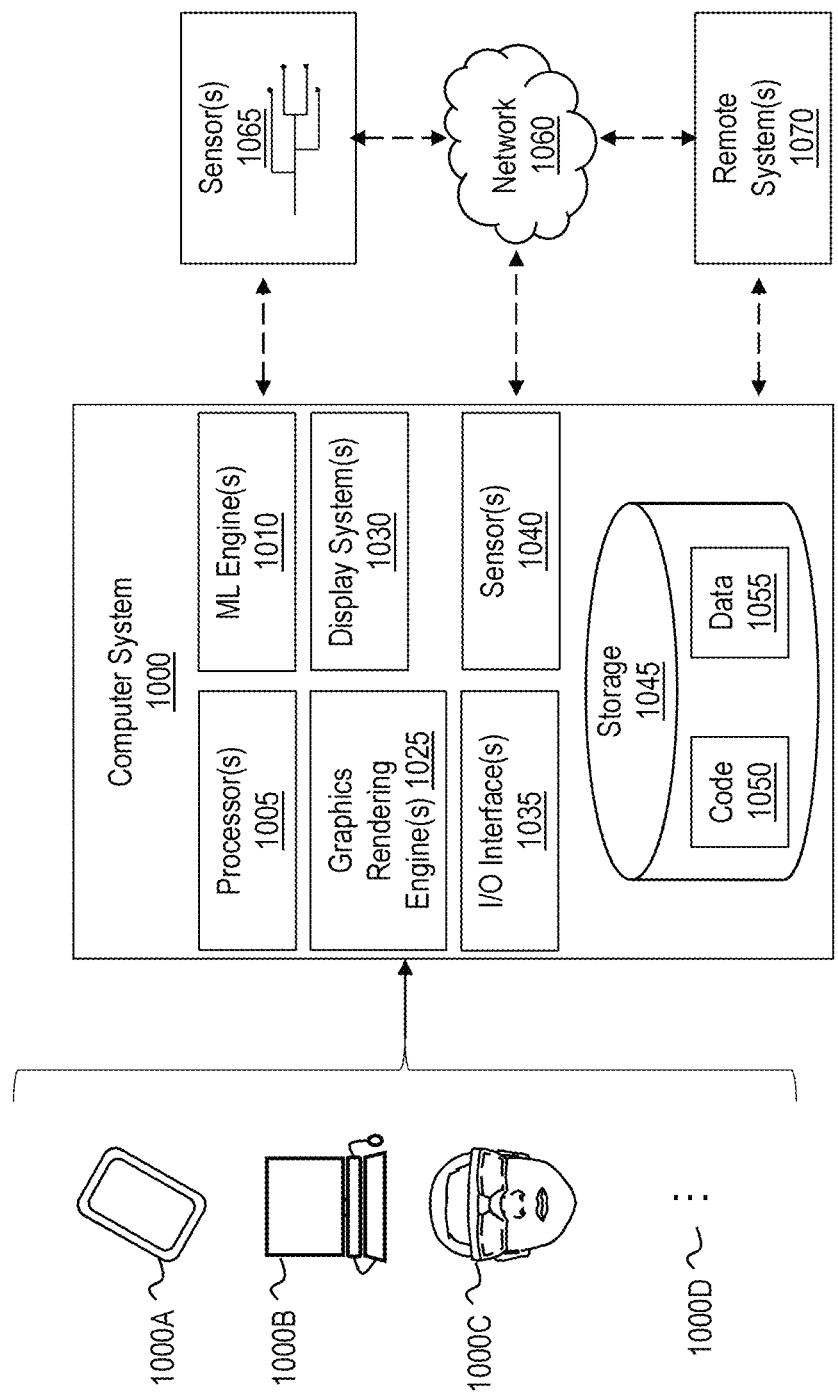
FIG. 10 illustrates an example computer system that may include and/or be used to perform disclosed embodiments.

Having just described the various features and functionalities of some of the disclosed embodiments, the focus will now be directed to FIG. 10 which illustrates an example computer system 1000 that may include and/or be used to facilitate the embodiments described herein, including the acts described in reference to FIG. 10. In particular, this computer system 1000 may be implemented as part of a mixed-reality HMD, such as any HMD referenced herein.

Computer system 1000 may take various different forms. For example, computer system 1000 may be embodied as a tablet, a desktop, a laptop, a mobile device, a cloud device, an HMD, or a standalone device, such as those described throughout this disclosure. Computer system 1000 may also be a distributed system that includes one or more connected computing components/devices that are in communication with computer system 1000. FIG. 10 specifically calls out how computer system 1000 may be embodied as a tablet 1000A, a laptop 1000B, or an HMD 1000C, but the ellipsis 1000D indicates that computer system 1000 may be embodied in other forms as well.

The computer system 1000 includes various different components. FIG. 10 shows that computer system 1000 includes one or more processors 1005 (aka a "hardware processing unit"), a machine learning (ML) engine 1010, graphics rendering engine(s) 1025, a display system 1030, input/output (I/O) interfaces 1035, one or more sensors 1040, and storage 1045.

Regarding the processor(s) 1005, it will be appreciated that the functionality described herein can be performed, at least in part, by one or more hardware logic components (e.g., the processor(s) 1005). For example, and without limitation, illustrative types of hardware logic components/processors that can be used include Field-Programmable Gate Arrays ("FPGA"), Program-Specific or Application-Specific Integrated Circuits ("ASIC"), Application-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1000. The different components, modules, engines, and services described herein may be implemented as objects or processors that execute on computer system 1000 (e.g. as separate threads).

The ML engine 1010 may be implemented as a specific processing unit (e.g., a dedicated processing unit as described earlier) configured to perform one or more specialized operations for the computer system 1000. The ML engine 1010 (or perhaps even just the processor(s) 1005) can be configured to perform any of the disclosed method acts or other functionalities.

In some instances, the graphics rendering engine 1025 is configured, with the hardware processing unit 1005, to render one or more virtual objects within the scene. As a result, the virtual objects accurately move in response to a movement of the user and/or in response to user input as the user interacts within the virtual scene. The computer system 1000 may include a display system 1030 (e.g., laser diodes, light emitting diodes (LEDs), microelectromechanical systems (MEMS), mirrors, lens systems, diffractive optical elements (DOES), display screens, and/or combinations thereof) for presenting virtual objects within the scene.

I/O interface(s) 1035 includes any type of input or output device. Such devices include, but are not limited to, touch screens, displays, a mouse, a keyboard, a controller, and so forth. Any type of input or output device should be included among I/O interface(s) 1035, without limitation.

During use, a user of the computer system 1000 is able to perceive information (e.g., a mixed-reality environment)

through a display screen that is included among the I/O interface(s) 1035 and that is visible to the user. The I/O interface(s) 1035 and sensors 1040/1065 may also include gesture detection devices, eye tracking systems, and/or other movement detecting components (e.g., head tracking cameras, depth detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 1000 may also be connected (via a wired or wireless connection) to external sensors 1065 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses.

Storage 1045 may be physical system memory, which may be volatile, non-volatile, or some combination of the two. The term "memory" may also be used herein to refer to non-volatile mass storage such as physical storage media. If computer system 1000 is distributed, the processing, memory, and/or storage capability may be distributed as well.

Storage 1045 is shown as including executable instructions (i.e. code 1050). The executable instructions (i.e. code 1050) represent instructions that are executable by the processor(s) 1005 of computer system 1000 to perform the disclosed operations, such as those described in the various methods. Storage 1045 is also shown as including data 1055. Data 1055 may include any type of data, including image data, depth/disparity maps and/or other depth data, pose data, tracking data, and so forth, without limitation.

The disclosed embodiments may comprise or utilize a special-purpose or general-purpose computer including computer hardware, such as, for example, one or more processors (such as processor(s) 1005) and system memory (such as storage 1045), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1000 may also be connected (via a wired or wireless connection) to external sensors (e.g., one or more remote cameras) or devices via a network 1060. For example, computer system 1000 can communicate with any number devices or cloud services to obtain or process data. In some cases, network 1060 may itself be a cloud network. Furthermore, computer system 1000 may also be connected through one or more wired or wireless networks 1060 to remote/separate computer systems(s) 1070 that are configured to perform any of the processing described with regard to computer system 1000.

A "network," like network 1060, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1000 will include one or more communication channels that are used to communicate with the network 1060. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system configured for dense depth computations aided by sparse feature matching, the system comprising:
    a first camera, a second camera, and a third camera;
    one or more processors; and
    one or more computer-readable hardware storage devices that store instructions that are executable by the one or more processors to cause the system to at least:
    generate a first image using the first camera, a second image using the second camera, and a third image using the third camera;
    generate a sparse disparity map using the first image and the third image, the generating of the sparse disparity map being performed by:
    identifying a set of feature points within the first image and a set of corresponding feature points within the third image; and
    identifying feature disparity values for the sparse disparity map based on the set of feature points and the set of corresponding feature points; and
    apply the first image, the second image, and the sparse disparity map as inputs for generating a dense disparity map.

2. The system of claim 1, wherein:
    the system is a head-mounted display (HMD),
    the first camera and the second camera are arranged along a first horizontal plane associated with and relative to the HMD, and
    the third camera is positioned on a second plane that is parallel to and vertically offset from the first horizontal plane, the second plane being associated with and relative to the HMD.

3. The system of claim 1, wherein:
    the system is a head-mounted display (HMD),
    the first camera, the second camera, and the third camera are mounted to the HMD, and
    a camera center of the third camera is positioned offset from a line that connects a camera center of the first camera to a camera center of the second camera.

4. The system of claim 1, wherein the first camera and the second camera are of a first modality, and wherein the third camera is of a second modality.

5. The system of claim 4, wherein the first camera and the second camera are low light cameras, and wherein the third camera is a thermal camera.

6. The system of claim 1, wherein identifying the set of feature points within the first image and the set of corresponding feature points within the third image comprises:
    identifying a set of feature descriptors for the set of feature points;
    identifying a set of epipolar lines within the third image based on the set of feature points; and
    identifying a set of corresponding feature descriptors within the third image, wherein each separate corresponding feature descriptor is associated with a separate epipolar line of the set of epipolar lines and corresponds to a separate feature descriptor of the set of feature descriptors.

7. The system of claim 1, wherein identifying feature disparity values comprises matching feature descriptors for the set of feature points with corresponding feature descriptors for the set of corresponding feature points.

8. The system of claim 1, wherein generating a dense disparity map comprises implementing a sparse matching term into a cost function for performing stereo matching on the first image and the second image.

9. The system of claim 8, wherein the sparse matching term applies a cost penalty for pixels of the dense disparity map that fail to share a same or similar disparity value with corresponding pixels of the sparse disparity map.

10. The system of claim 9, wherein the cost penalty causes pixels of the dense disparity map that correspond to a corresponding feature disparity value of the sparse disparity map to implement the corresponding feature disparity value from the sparse disparity map.

11. The system of claim 1, wherein generating the dense disparity map comprises, for at least a particular pixel of the dense disparity map:
    identifying a plurality of pixel coordinates for pixels of the dense disparity map that are proximate to the particular pixel;
    identifying one or more pixels of the sparse disparity map at the pixel coordinates of the plurality of pixel coordinates; and
    generating a disparity value for the particular pixel based on the one or more pixels of the sparse disparity map.

12. The system of claim 1, wherein the system is a head-mounted display (HMD), and wherein the instructions are executable by the one or more processors to further cause the system to at least:
    reproject the dense disparity map to correspond to a user perspective of a user that is operating the HMD.

13. A method for performing dense depth computations aided by sparse feature matching, comprising:
    generating a first image using a first camera, a second image using a second camera, and a third image using a third camera;
    generating a sparse disparity map using the first image and the third image, the generating of the sparse disparity map being performed by:
    identifying a set of feature points within the first image and a set of corresponding feature points within the third image; and
    identifying feature disparity values for the sparse disparity map based on the set of feature points and the set of corresponding feature points; and
    applying the first image, the second image, and the sparse disparity map as inputs for generating a dense disparity map.

14. The method of claim 13, wherein the first camera and the second camera are low light cameras, and wherein the third camera is a thermal camera.

15. The method of claim 13, wherein identifying the set of feature points within the first image and the set of corresponding feature points within the third image comprises:

identifying a set of feature descriptors for the set of feature points;

identifying a set of epipolar lines within the third image based on the set of feature points; and identifying a set of corresponding feature descriptors within the third image, wherein each separate corresponding feature descriptor is associated with a separate epipolar line of the set of epipolar lines and corresponds to a separate feature descriptor of the set of feature descriptors.

16. The method of claim 13, wherein identifying feature disparity values comprises matching feature descriptors for the set of feature points with corresponding feature descriptors for the set of corresponding feature points.

17. The method of claim 13, wherein generating a dense disparity map comprises implementing a sparse matching term into a cost function for performing stereo matching on the first image and the second image.

18. One or more computer-readable hardware storage devices that store instructions that are executable by one or more processors to cause a system to at least:

generate a first image using a first camera, a second image using a second camera, and a third image using a third camera;

generate a sparse disparity map using the first image and the third image, the generating of the sparse disparity map being performed by:

identifying a set of feature points within the first image and a set of corresponding feature points within the third image; and identifying feature disparity values for the sparse disparity map based on the set of feature points and the set of corresponding feature points; and apply the first image, the second image, and the sparse disparity map as inputs for generating a dense disparity map.

19. The one or more computer-readable hardware storage devices of claim 18, wherein identifying the set of feature points within the first image and the set of corresponding feature points within the third image comprises:

identifying a set of feature descriptors for the set of feature points;

identifying a set of epipolar lines within the third image based on the set of feature points; and identifying a set of corresponding feature descriptors within the third image, wherein each separate corresponding feature descriptor is associated with a separate epipolar line of the set of epipolar lines and corresponds to a separate feature descriptor of the set of feature descriptors.

20. The one or more computer-readable hardware storage devices of claim 18, wherein identifying feature disparity values comprises matching feature descriptors for the set of feature points with corresponding feature descriptors for the set of corresponding feature points.

* * * * *